United States Patent [19]

Selliers

[11] Patent Number: 6,144,897
[45] Date of Patent: Nov. 7, 2000

[54] CONTROL METHOD FOR PROCESSES OF SYNTHESIS OF CHEMICAL PRODUCTS

[75] Inventor: Jacques De Selliers, Brussels, Belgium

[73] Assignee: Solvay Polyolefins Europe-Belgium (Société Anonyme), Brussels, Belgium

[21] Appl. No.: 08/973,101

[22] PCT Filed: Jun. 1, 1996

[86] PCT No.: PCT/EP96/02408

§ 371 Date: Dec. 9, 1997

§ 102(e) Date: Dec. 9, 1997

[87] PCT Pub. No.: WO96/41822

PCT Pub. Date: Dec. 27, 1996

[30] Foreign Application Priority Data

Jun. 9, 1995 [BE] Belgium ................................. 9500506

[51] Int. Cl.$^7$ .................................................. G05B 21/00
[52] U.S. Cl. ...................... 700/269; 700/266; 700/268; 48/127.5; 204/157.15; 585/700
[58] Field of Search ....................................... 700/269, 268, 700/32, 37, 38, 45, 47, 285, 266, 205, 199, 265; 585/700; 48/127.5; 204/157.15

[56] References Cited

U.S. PATENT DOCUMENTS

| | | | |
|---|---|---|---|
| 4,668,473 | 5/1987 | Agarwal | 422/62 |
| 4,725,654 | 2/1988 | Priddy et al. | 526/60 |
| 4,921,919 | 5/1990 | Lin et al. | 526/88 |
| 5,504,166 | 4/1996 | Buchelli et al. | 526/60 |

FOREIGN PATENT DOCUMENTS

| | | |
|---|---|---|
| 0 398 706 | 11/1990 | European Pat. Off. . |
| 0 710 901 | 5/1996 | European Pat. Off. . |

OTHER PUBLICATIONS

Robertson, "A Structured Approach to Electrical Reliability Auditing of Chemical Production Facilities", IEEE. pp. 205–510, Nov. 2, 1992.

Tan et al., "Nonlinear L/SUB INFIN// Identifications for CH/SUB 4/–Air Combustion", IEEE. pp. 80–85, 1993.

Robertson, "A Structured Approach to Electrical Reliability Auditing of Chemical Production Facilities", IEEE. pp. 213–221, 1990.

"Perry's Chemical Engineers' Handbook", 6$^{th}$Edition, Robert H. Perry and Don Green; McGraw–Hill International Editions, 1984, chapters 2 and 22.

Mark Davis, "Numerical Methods and Modelling for Chemical Engineers"; John Wiley & Sons, New York, 1984, p. 19.

"Chemical Process Control—An Introduction to Theory and Practice"; George Stephanopoulos, Prentice–Hall International Series in the Physical and Chemical Enginering Sciences, 1984, chapter 21.

Numerical Recipes; William H. Press et al, Cambridge University Press, 1986.

George G. Ardell and Bogden Gumowski, "Model Prediction for Reactor Control", CEP Jun. 1983.

"Model Predictive Control for Grade Transitions of a Polypropylene Reactor"; Magne Hillestad et al; presneted at Escape 4, 4$^{th}$ European Symposium a Computer Aided Process Engineering, Dublin, Mar. 1994.

C. Smith and A.B. Corripio, Principles and Practice of Automatic Process Control, John Wiley & Sons, 1985 pp. 369 to 378.

R.G.E. Franks, Mathematical Modelling in Chemical Engineering, John Wiley & Sons, 1966, pp. 64 to 69.

B.A. Ogunnaike & W.H. Ray, Process Dynamics, Modelling and Control, OUP, 1994, pp. 163–169.

*Primary Examiner*—William Grant
*Assistant Examiner*—McDiennel Marc
*Attorney, Agent, or Firm*—Oblon, Spivak, McClelland, Maier & Neustadt, P.C.

[57] ABSTRACT

A control method for a process of synthesis of at least one chemical product in an equipment comprising at least one reactor (R) which is assimilated to a mixed reactor, in which manipulated variables (GC) allow to act on the course of the process in order to make one or more variables related to the properties of the product and/or to the running of the process, which are called controlled variables (GR).

21 Claims, 10 Drawing Sheets

CONTROL METHOD FOR PROCESSES OF SYNTHESIS OF CHEMICAL PRODUCTS

BACKGROUND OF THE INVENTION

1. Field of the Invention

The present invention relates to a control method for processes of synthesis of chemical products. It also relates to a control device for making use of this method and to a process of synthesis, in particular of polymer, controlled by this method.

2. Description of the Background

In a process of synthesis of chemical products which is conducted conventionally, controllers of PID (proportional-integral-differential) type are used for controlling individually a larger or smaller number of variables (temperatures, flow rates, pressures, etc.) which affect the course of the synthesis. In other words, for each temperature, flow rate or pressure to be controlled, its actual value is measured continuously (or intermittently), and a PID controller compares this actual value with a set point and acts on the variable to be controlled so as to reduce, if appropriate, the difference between the set point and the measured value.

In view of the complexity of most industrial processes of chemical synthesis, the set points of the various controllers must today still be adjusted empirically in order to obtain finally the desired properties for the synthesized product. Recipes are used for this purpose, which provide combinations of parameters determined empirically to obtain, in a steady state, the desired properties for the synthesized product.

Empirical relationships between the controlled variables and the properties of the synthesized product could be deduced from these recipes with the help of more or less sophisticated statistical tools. It is obvious, however, that these empirical relationships can hardly take into account the many interdependencies which exist between the various variables which are controlled separately, or the unknown perturbations such as the impurity contents of the raw materials.

It is also obvious that a traditional closed-loop control, employing measurements of essential properties for the synthesized product as feedback corrections, is difficult to apply to most processes of synthesis. This is because the dead times involved either in the process or in the measurements or analyses used as feedback corrections are too long and the independences between the various variables ruling the process are too complex.

International Application WO 93/24533 describes a control method for a process of gas phase polymerization of an alpha-olefin in a horizontal reactor, in which control parameters make it possible to act on the course of the process in order to make the melt index (MFR) of the polymer equal to the corresponding set point, the method including the following steps:

determining the relationships between the melt index of the polymer leaving the reactor and a first series of parameters, controlling this first series of parameters, calculating the MFR of the polymer, adapting at least one of the parameters so as to adjust the calculated MFR to a predetermined value.

It has been known for a long time that processes of synthesis, especially processes of continuous polymer synthesis (polymerization processes), equipped with controllers with empirically adjusted set points have major disadvantages which can be summarized as follows:

start-ups of the synthesis process take much time and produce large quantities of off-specification product;

grade changes are slow, which also results in the production of large quantities of transitional off-specification products;

the production rate of the process, that is to say the mass of product(s) synthesized per time unit is difficult to chance without impairing the properties of this or these products;

the consistency of the essential properties of the synthesized product(s) is often poor, even in a steady state.

In order to avoid empirical adjusting of the set points, it has been proposed in the specialist literature to use control methods for processes of synthesis which make use of characteristic equations modelling the process of synthesis in order to relate some properties of the synthesized product (s) to the running conditions of the reactor(s) during the synthesis. However, in order to limit the complexity of these characteristic equations, it was hitherto considered that in practice it was necessary either to consider solely the static case (steady state), or to limit one-self to a highly simplified empirical modelling of the process dynamics. The use of a static model is limited to the control of a fairly steady state production.

In the case of empirical modelling the characteristic equations are valid only for a narrow range of validity (near the point where the modelling has been performed). In both cases the start-up phases and the transition phases are poorly controlled. It is undoubtedly possible to envisage "covering" a wider range of operating conditions by undertaking such local modelling at several different points in the region of the operating parameters, but such an approach becomes prohibitive as soon as an attempt is made to control a number of variables by acting on many parameters.

It would consequently be desirable to have available a control method and a control device which are simple and better adapted to the specificities of the dynamics of processes of synthesis of chemical products.

SUMMARY OF THE INVENTION

To this end, the present invention relates to a control method for a process of synthesis of at least one chemical product in an equipment comprising at least one reactor (R) which can be assimilated to a perfectly mixed reactor, in which one or more manipulated variables (GC) make it possible to act on the course of the process in order to make one or more variables related to the properties of the product and/or to the course of the process, which are called controlled variables (GR), equal to the corresponding set points ($C_{GR}$) (or at least as close as possible to the latter), the said method including the following steps:

(a) input of set points concerning the controlled variables ($C_{GR}$);

(b) computation, by means of a prediction unit (OP), of predictions of the controlled variables ($P_{GR}$), based on measurements of the process manipulated variables ($M_{GC}$);

(c) use of a control unit (OC) to compute the set points of the process manipulated variables ($C_{GC}$), based on the set points ($C_{GR}$) and the predictions ($P_{GR}$) of the controlled variables;

(d) transmission of the set points of the process manipulated variables ($C_{GC}$) to actuators, or to control units controlling the actuators, in order to act on the course of the process;

in which the prediction unit (OP) is based on a mathematical model of the process, called a direct model (M) and is designed in such a way that the mass $M_{XR}$ of at least one constituent (X) in the reactor (R) is predicted by the equation:

$$M_{XR}=LAG(F_{XRin}, \tau_X, \tau_X)$$

in which:

$F_{XRin}$ is the mass flow rate of the constituent X entering the reactor R;

$\tau_X$ is the residence time of X in the reactor (time constant), which is $$\tau_X=M_{XR}/(\Sigma Fxdis)$$

in which:

$M_{XR}$ denotes the last calculated value of the mass of the constituent X present in the reactor R;

$\Sigma$ Fxdis denotes the sum of all the mass flow rates Fxdis at which the constituent X disappears from the reactor R, especially by reaction and/or by leaving the reactor;

the function y=LAG (u, $\tau$) is the solution of the differential equation $$u = \tau \cdot \frac{dy}{dt} + y$$

calculated with the instantaneous value of u and of $\tau$, and with the last calculated value of y.

DETAILED DESCRIPTION OF THE INVENTION

Figure 1:
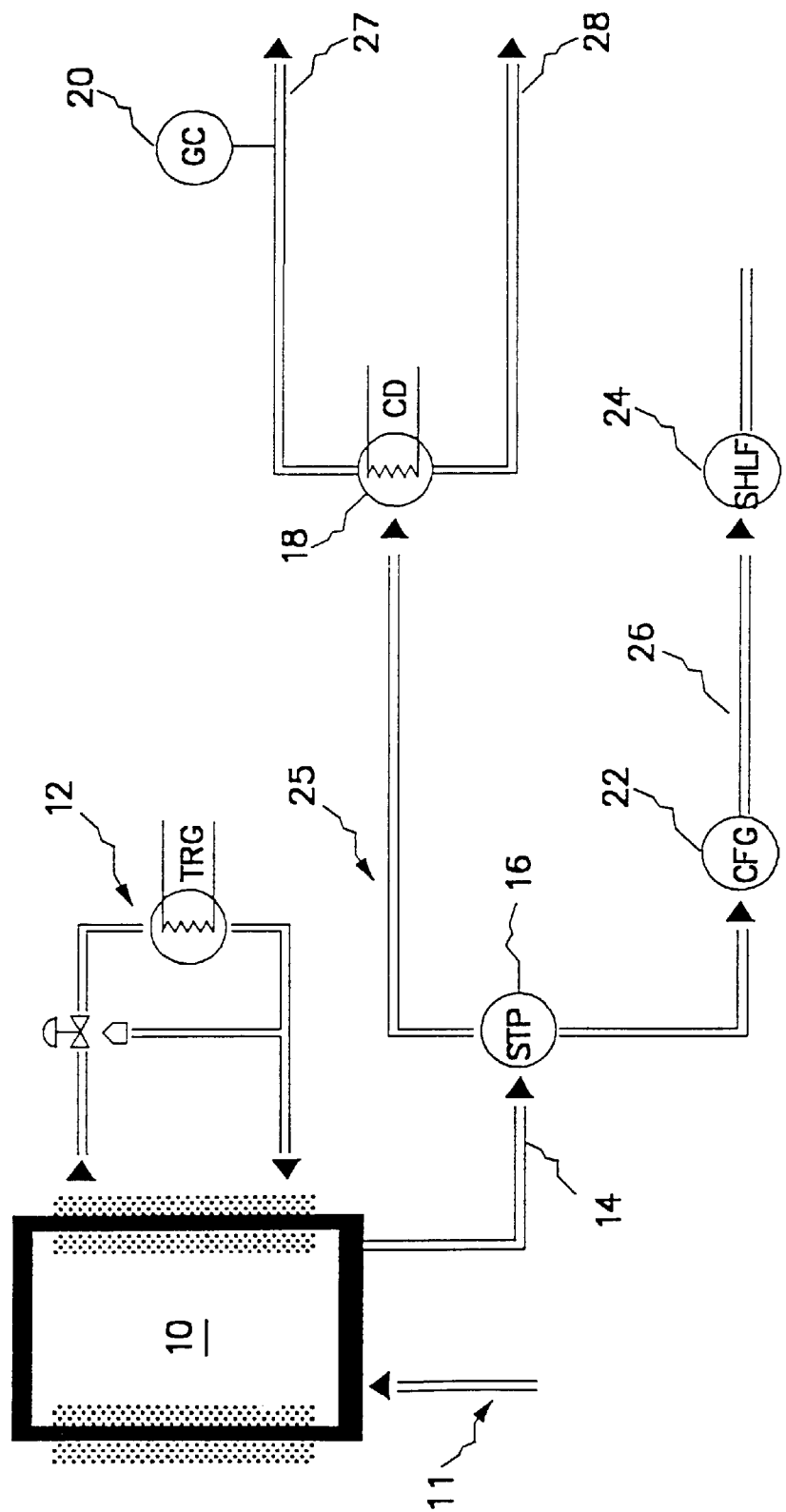

The advantage of this method is that the abovementioned differential equation is solved by a simple algebraic calculation, for example using the following formula (T denoting the time interval, generally small in relation to $\tau$, separating the successive calculations) or using a formula equivalent to the latter:

$$y(t) = \frac{y(t-T) + u(t) \cdot \frac{T}{\tau(t)}}{1 + \frac{T}{\tau(t)}}$$

In the case where the masses of several constituents are evaluated as set out above, the method of the invention is particularly advantageous insofar as these masses can be calculated sequentially by such simple algebraic calculations, recalculated frequently (in general T<<$\tau$). On the other hand, traditional methods require the simultaneous solving of a system of differential equations, and this generally requires a high calculating power and sophisticated algorithms of numerical calculation (integration); as a result, each iteration of calculation takes a long time and consequently a control of this type reacts badly to rapid variations.

The controlled process of synthesis can be used for the synthesis of a monomeric or polymeric compound; very good results have been obtained in the case of the control of polymerization processes. The process also extends to the case where a number of useful products are synthesized simultaneously in the same process. The process may be continuous or noncontinuous (batch); the control method of the invention gives excellent results in the case of continuous processes. The controlled process of synthesis may optionally constitute only a part of a vaster process, the other parts of which are controlled differently or are not controlled. In order for the control method of the invention to be applicable it is necessary that at least one reactor may be assimilated to a perfectly mixed reactor, that is to say a reactor in which the various variables (temperature, concentrations of the constituents present, and the like) are virtually identical at each point. Other possible reactors may be of the piston (plug flow) type; they are modelled mathematically using dead times. The method is also applicable to a process taking place in a number of reactors arranged in series and/or in parallel, capable of producing products with identical or different properties.

"Constituents" is intended to denote all of the substances present in the reactor and intended to take part in the synthesis or to permit it: not only the starting reactants as well as the synthesized product(s), but also any substance(s) not undergoing any conversion, such as solvents, catalysts, and the like.

In addition to one or more reactors, the plant in which the process takes place may optionally include other conventional devices such as pressure-reducing valves, strippers, condensers, driers, distillation columns and the like. These auxiliary devices can furthermore generally also be considered to be reactors (perfectly mixed or of plug flow type), even if no chemical reaction takes place therein.

In the case of a polymerization process the "variables related to the properties of the product" may, for example, be chosen from the molecular mass, the melt index, the standard density, the comonomer content when a comonomer is present, and the like.

Examples of "variables related to the process" are especially the temperature and the pressure prevailing in the reactor, the production rate of the process, the concentrations of the various reactants in the reactor, and the like. The production rate denotes the mass of product synthesized per unit time, which is however not necessarily equal to the flow rate of synthesized product leaving the reactor: thus, by way of example, especially in the start-up phases, the mass flow rate of synthesized product leaving the reactor is generally very low, or even zero, although the synthesis has begun, that is to say that this exit flow rate is then lower than the production rate. On the other hand, in a steady state the production rate can be assimilated to the mass of product synthesized per unit time.

Examples of "manipulated variables" are flow rates of reactants entering the reactor, the power supplied to the heating devices, and the like. These are variables which make it possible to act on the course of the process as well as, generally, the properties of the synthesized product.

The set point or points of the manipulated variable or variables are transmitted directly or indirectly to conventional actuators such as especially valves, heating units, and the like. "Indirectly" means that the manipulated variables can be transmitted through the intermediacy of one or more control units (generally controlling a single variable, e.g. PID controllers), controlling the actuator or actuators ("local" control).

Insofar as hardware is concerned, the prediction unit and the control unit are generally conventional computing devices enabling calculations to be performed as a function of their cabling or their programming; they may in particular be computers or digital systems for command-control (SNCC). A single device may advantageously combine the prediction and control functions. The computing device or devices used are preferably of the digital type and supply the results of their calculations at regular intervals (intermittently). The time intervals separating the supply of these results may vary with time and may also differ according to the result involved: it is clear that rapidly varying variables must be recalculated more frequently than slowly varying variables. Shift registers may be employed for materially simulating the dead times.

The prediction unit is based on a direct mathematical model of the process (M), in which the reactor (R) is assimilated to a perfectly mixed reactor; one or more pure delays (dead times) may optionally be taken into account to represent possible reactors of plug flow type, possible transport delays or delays in obtaining results of measurements, etc.

The control unit is preferably based on the reverse of the direct model employed in the prediction unit (reverse model).

In general the sum $\Sigma$ Fxdis of all the mass flow rates (Fxdis) at which the constituent X disappears from the reactor R includes two terms:

$F_{RX}$, which denotes the mass flow rate at which X is consumed in one or more possible chemical reactions;

$F_{Xout}$, which denotes the possible mass flow rate of X leaving the reactor by drawing-off during the reaction, in the (usual) case where X is not entirely consumed by reaction in this reactor; or else, for example, by evaporation, in the case of an open reactor.

The advantage of the method is that the Fxdis terms are generally proportional to $M_{XR}$; for example, in general $$F_{Xout} = M_{XR}/\tau_R$$

($\tau_R$ denoting the residence time of the reactor R) and $$F_{RX} = R_X \cdot M_{XR}$$

($R_X$ denoting the reactivity of X in the reactor R). In this case the expression which gives $\tau_X$ is simplified and becomes:

$$\tau_X = 1/(R_X + 1/\tau_R)$$

This expression is independent of $M_{XR}$, and this constitutes an extremely advantageous simplification.

Another advantage of the method lies in the periodic calculation of the residence time $\tau_X$. Actually, $\tau_X$ represents well the dynamics of the constituent considered in the reactor. This makes it possible especially to follow the change in this parameter, which is important for understanding the dynamics of the process, and consequently for its control. On the other hand, the empirical methods of "black box" type do not make it possible to gain access to this parameter.

The calculation of the predictions of the controlled variables ($P_{GR}$) may advantageously additionally take into account one or more measurements of controlled variables ($M_{GR}$), of manipulated variables ($M_{GC}$) and/or of other variables related to the running of the process ($M_{AP}$).

Similarly, advantageously, the calculation of the set points of the process manipulated variables ($C_{GC}$) may additionally take into account one or more measurements of controlled variables ($M_{GR}$), of manipulated variables ($M_{GC}$) and/or of other variables related to the running of the process ($M_{AP}$) which are identical with or different from those optionally taken into account for the calculation of the predictions of the controlled variables ($P_{GR}$).

All the measurements which are discussed in the present description are not necessarily direct measurements, in the sense that one or more of them may possibly be inferential measurements, that is to say values obtained by calculation from one or a number of other direct measurements. Thus, for example, the production rate of some exothermic processes of synthesis cannot be measured directly, but an inferential measurement thereof can be obtained by calculation, for example from (direct) measurements of the flow rate and of the entry and exit temperatures of the coolant fluid.

In the particular case of polymerization processes the property or properties of the polymer involved in the control are preferably chosen from the specific density (SD) of the polymer, the rheological properties of the polymer melt, and its comonomer content. In particular, the rheological property or properties involved in the control method are advantageously the melt index of the polymer and/or a viscosity measurement.

One or more properties of the polymer are advantageously evaluated by employing a technique chosen from near infrared spectroscopy (NIR), Fourier transform infrared spectroscopy (FTIR) and nuclear magnetic resonance (NMR).

In particular, one or more properties of the polymer can be advantageously evaluated by applying a preestablished correlation relationship to the results of measurements carried out by near infrared spectroscopy (NIR) at a number of wavelengths predetermined as a function of the nature of the polymer and chosen between 0.8 and 2.6 um.

Further details concerning the carrying out of such measurements in the context of the control of polymerization processes can be found in Patent Application EP 328826 (U.S. Pat. No. 5,155,184).

In order to take account of possible deviations between the measurements and the predictions of the controlled variables it may be useful to resort to a correction.

A first type of correction consists in correcting the set point of at least one controlled variable ($C_{GR}$) on the basis of the (advantageously filtered) deviation between the measurement ($M_{GR}$) and the prediction ($P_{GR}$) of this controlled variable, so as to make the control effective ($M_{GR} = C_{GR}$) even in the presence of an error in the prediction of this controlled variable. This technique is commonly referred to by the expression "internal model control" (IMC).

A second type of correction consists in periodically adapting the model (M) of the process on the basis of the (advantageously filtered) deviation between the predictions ($P_{GR}$) and the measurements ($M_{GR}$) of the controlled variables, such that, here as well, the model of the process should supply predictions of the controlled variables ($P_{GR}$) which are as near as possible (ideally equal) to the measurements of these variables ($M_{GR}$), and this is essential for an efficacious control.

The adaptation consists in recalibrating the model, that is to say in recalculating one or more of its parameters; normally the number of recalculated parameters does not exceed the number of controlled variables for which both a prediction and a measurement are available. A resynchronization (shift in time) of these measurements is often desirable, above all when they are measurements of properties of the synthesized product which take a long time to obtain. This second type of correction is more advantageous, insofar as it allows the model to be also adapted in respect of its dynamics.

The adaptation relates not only to the direct model of the process (prediction unit), but also to the reverse model (control unit).

According to an advantageous alternative form the measurements ($M_{GR}$) of the controlled variables are involved only in the optional adaptation of the model of the process and are not directly involved in the calculation of the set points of the manipulated variables of the process ($C_{GC}$).

That is to say that the measurements of the controlled variables are not involved in the actual control: the advantage of this is that the quality of the control is thus not affected by the possible slowness of the evaluation of the product properties.

Another aspect of the invention relates to a control method as described above, applied to a polymerization process, including one or more of the following additional steps:

calculation of a set point of temperature in the reactor as a function of one or more set points of the product properties; and transmission of temperature set point to one or more actuators making it possible to modify the temperature in the reactor (possibly indirectly, that is to say through the intermediacy of one or more control units, e.g. PID controllers, controlling the actuator(s));

calculation of a heat balance for the reactor, based especially on temperature measurements; use of this heat balance so as to determine the quantity of polymer synthesized per time unit (production rate) and/or the catalyst efficiency and/or the concentration of at least one reactant in the reactor;

calculation of the quantity of heat produced by the polymerization, by a calculation of the quantity of the reactant or reactants which polymerize; determination by this means of the quantity of heat which must be added or removed to maintain the reactor temperature; use of the result of the said calculation (for example by feedforward) to improve the temperature control, so as to conform as well as possible to the set point of temperature, especially in case of changes in the production rate.

These alternative forms are based on the relation which exists between the quantity of the reactant s) taking part in the reaction and the quantity of heat produced or absorbed by the reaction.

According to an advantageous alternative form the property $Px_R$ of a constituent "x" in the reactor R, which is assimilated to a perfectly mixed reactor, is calculated as follows:

$$Px_R = LAG(Px_{IN}, Mx_R/Fx_{IN})$$

where

"Px" is a property of a constituent "x", corresponding substantially to the linear mixing law $Px_{1+2} = w_1 \cdot Px_1 + w_2 \cdot Px_2$, $w_1$ and $w_2$ being the mass fractions of two mixed fractions 1 and 2 of property $Px_1$ and $Px_2$ ($w_1 + w_2 = 1$);

$Px_{1+2}$ is the property of x as it leaves the reactor after mixing;

$Px_{IN}$ is the property of the constituent "x" as it enters the reactor R;

$Mx_R$ is the mass of the constituent x in the reactor R;

$Fx_{IN}$ is the mass flow rate of the constituent x entering the reactor R.

A mathematical transformation sometimes makes it possible to make linear (additive) some variables which are not linear: for example, the melt index of a polymer does not obey a linear mixing law but its logarithm; the abovementioned calculation of $Px_{1+2}$ is therefore carried out on the logarithm of this parameter.

According to another advantageous alternative form the control method of the invention includes the following steps:

input of set points relating to one or more properties of the product to be synthesized, into a master algorithm;

input of the set point of the production rate of the process into a slave algorithm;

computing of the concentration set points of the constituents in the reactor with the aid of the master algorithm, especially as a function of the set points and of the measurements of the product properties and of measurements or predictions of the concentrations of the various constituents in the reactor;

transmission of the concentration set points which are calculated by the master algorithm as input variables into the slave algorithm;

computation of flow rate set points of the constituents entering the reactor, with the aid of the slave algorithm, especially as a function of the set point of the production rate of the process, of concentration set points and of flow rate measurements of the constituents entering the reactor, and transmission of the flow rate set points which are calculated with the aid of the slave algorithm to one or more actuators (possibly indirectly, that is to say through the intermediacy of one or more control units, e.g. PID controllers controlling the actuator(s)) in order to control the flow rates of the constituents entering the reactor, in which the master algorithm and/or the slave algorithm are used as described above, that is to say by using the LAG function to calculate the mass of at least one constituent in the reactor.

The master and slave algorithms are also used by means of one or several conventional computing devices. According to an advantageous alternative form, all of the calculations (prediction, control, and the like) of these two algorithms are performed by the same computing device.

Measurements of temperature (e.g. temperature in the reactor and/or entry and/or exit temperature of a possible coolant fluid) are advantageously involved as additional variables for input into the prediction and/or control unit.

The slave algorithm preferably also takes into account the measurements of the composition of constituents present in or leaving the reactor.

In addition, the control method advantageously includes a step of calculation with the aid of the slave algorithm, as a function of the flow rate measurements, of predictions of concentrations transmitted to the master algorithm for calculating predictions of properties used as additional input variables in the calculation of the set points of concentrations.

The master and slave algorithms form a control of the cascade type. It is particularly advantageous that the master algorithm and/or the slave algorithm should be adaptive, that is to say that some of their parameters should be recalculated periodically (at regular or irregular intervals). Such an adaptation makes it possible especially to guarantee that the mathematical model describes the process in its current state as faithfully as possible, even in the event of change in some operating conditions (temperature, pressure, production rate, and the like) and in the event of perturbations (poisoning of the catalyst, etc.).

The master algorithm carries out the control of the properties of the product with the aid of a model based on characteristic equations relating the properties of the product to the concentrations of the various constituents in the reactor, as well as possibly to the temperature prevailing in the reactor. The slave algorithm regulates the concentrations of one or more constituents by acting on the feed flow rates of one or more constituents, which may be different.

The advantage of this "master-slave" cascade lies in the fact that the master model determines with precision the concentrations of constituents which are necessary to obtain properties which are desired for the synthesized product, and that the slave model ensures that the values imposed by the master are obeyed. Being steered by the master, the slave is consequently capable:

of quickly bringing the concentrations to the values desired by the master and maintaining them there;

of efficiently controlling the production rate of the process without perturbing the concentrations.

This master-slave cascade is particularly effective because both the master and the slave take the process dynamics into account by virtue of the use of the LAG function in the calculations.

The slave algorithm can additionally be designed so as to supply the master algorithm with reliable predictions of concentrations. From these predictions or measurements of concentrations the master algorithm deduces reliable predictions of properties of the product which is being synthesized in the reactor. By comparing these predictions of properties with the set points of properties the master algorithm can, where appropriate, intervene and correct the set points of concentrations. This correction is possible even before a discrepancy arises between a variable and its set point. The fact that predictions of properties obtained from predictions or from measurements of concentrations are taken into account makes it possible to reduce considerably the temporal fluctuations in the properties of the synthesized product and this results in better consistency of the product quality.

If the properties of the product to be synthesized depend on the temperature in the reactor(s), it is preferable to provide a temperature control by the slave algorithm. The latter sets up the heat balance of each reactor and, by means of the calculation of the production rate, determines the quantity of heat which must be added or removed in order to conform to the set points of temperature which are calculated by the master algorithm. From these results it derives input set points for heat control units of the synthesis equipment. It will be appreciated that this type of procedure makes it possible to intervene on the heat control units of the synthesis equipment even before the temperature has changed. Measurements of temperatures are furthermore advantageously involved as additional inputs into the slave algorithm.

The master algorithm advantageously includes the following structure:

a prediction unit based on a direct model of the process, allowing to supply a prediction of the properties of the synthesized product as a function of measurements and/or of predictions of the concentrations of the constituents;

an adaptation unit comparing the predictions of properties calculated by the prediction unit with values actually measured on the synthesized product and deriving adaptation parameters from this comparison, the said adaptation parameters being involved as additional inputs into the said prediction unit of the master algorithm; and a control unit based on a reverse model of the process, for computing, as a function of the set points and of the predictions of properties of the product to be synthesized, set points of concentrations for the slave algorithm, the said adaptation parameters also being involved as additional inputs into the said control unit.

The slave algorithm advantageously includes the following structure:

a prediction unit based on a direct model of the process allowing to supply a prediction of the concentrations of one or more of the constituents, based on a material balance in the reactor;

an adaptation unit comparing the predictions of concentrations calculated by the direct model with measurements of concentration and deriving adaptation parameters from this comparison, the said adaptation parameters being involved as additional inputs into the said prediction unit of the slave algorithm; and a control unit based on a reverse model of the process, for computing, as a function of the set point of production rate, of the set points of concentration which are computed by the control unit of the master algorithm and of the predictions of concentration which are calculated by the prediction unit of the slave algorithm, the set points for the flow rates entering the reactor, the said adaptation parameters being involved as additional inputs into the said control unit of the slave algorithm.

The dynamics of the process are advantageously described and calculated by means of functions of the type $y=LAG(u, \tau)$, this function being the solution of the differential equation $$u = \tau \cdot \frac{dy}{dt} + y$$

where the arguments $u$ and $\tau$ vary with time. The use of this function in accordance with the theorems 1 and 2 set out below makes it possible to solve sequentially the material balances used by the slave algorithm and to describe the process kinetics using simple characteristic equations in the master algorithm. The LAG function further makes it possible to reduce considerably the volume of the calculations that are needed and consequently makes it unnecessary to use fast and powerful computers. In addition, this function enables the direct and reverse models of the process or of some of its parts to be established in a particularly simple manner.

The chief qualities of the proposed control can be summarized as follows:

anticipation: the control begins to correct the measured perturbations even before their effect on the measurements of the properties has been seen (use of predictions of concentrations, of predictions of properties and of predictions of temperatures in the algorithms);

precision even in the presence of perturbations: the direct model and the reverse model are continually recalibrated by using the measurements of the properties (adaptation);

extended validity: the algorithm retains its validity during the changes in the production rate and grade changes, and during start-ups and stoppages (expression of the process dynamics as an equation, use of predictions for the variables whose measurements involve long dead times);

simplicity: the development and the implementation are facilitated by virtue of an original method of expressing the process dynamics as an equation (LAG function).

The process of synthesis to be controlled is thus modelled in a form which is generally referred to as a "knowledge model" (first principle model), that is to say that its model is developed from equations which reflect the detailed physicochemical course of the process. Such an approach makes it possible to obtain, by means of a mathematically relatively simple set of equations, results which are superior to those that would have been obtained by means of an empirical model of a "black box" type, supplying especially parameters related to real variables and better validity outside the identification space (extrapolation). Most of the empirical models employ complex equations, often of a high order if it is desired to obtain a correct simulation of the process dynamics, and in which the parameters (especially the time constants) must be identified for a precise operating point; the model is valid only in the immediate neighbourhood of this operating point. It is difficult to generalize such an approach to a large number of operating points in the case of an actual process of chemical synthesis involving many variables.

In contrast, according to the control method of the invention, a set of purely static, simple equations is employed; the process dynamics are simulated by simple functions (cf. the LAG function above). Advantageously, the residence times (time constants of the equations) can be recalculated as often as desired, and this does not present any problem, given the simplicity of the equations. In the final outcome, a set of equations which are extremely simple and easy to solve in real time, even at a high frequency, is obtained.

The proposed control method can be advantageously applied to processes of synthesis, especially continuous synthesis, of polymers (polymerization), and especially to the continuous polymerization of olefins such as, for example, ethylene or propylene, in liquid phase as well as in gaseous phase.

The present invention also relates to a process for the synthesis of one or more chemical products, controlled by means of a control method in accordance with the invention. In particular, very good results have been obtained in the case of the control of a process for continuous synthesis of polyethylene by polymerization of ethylene in at least one reactor, the reactants including ethylene, hydrogen and/or an optional comonomer, the polymerization reaction taking place in a solvent in the presence of a catalyst and part of the content of the reactor being continuously or intermittently removed. This process can equally well take place in liquid phase or in gaseous phase; it preferably takes place in liquid phase (in a solvent).

The method applies in a similar manner to the synthesis of polypropylene (the chief starting monomer in this case being propylene instead of ethylene), it being also possible for propane to be present if the process takes place in gaseous phase. In the case of polypropylene, the melt index is often referred to as MFI instead of MI.

The invention also relates to a control device intended to implement the control method for the invention, and to a plant for the synthesis of one or more chemical products, including such a control device.

More precisely, the invention also relates to a device for controlling a process of synthesis of a chemical product in a synthesis equipment including at least one reactor, the said device including:
at least one computing unit;
means for inputting set points of properties of the product to be synthesized into the computing unit;
means for inputting set points of production rate of the product to be synthesized into the computing unit;
units for measuring the flow rate of the flows entering the reactor;
units for measuring the composition of the flows leaving the reactor;
units for controlling flow rates (actuators) for regulating the flow rates of the flows entering the reactor;
means of communication between the said computing unit, the said units for measuring flow rate and the said regulating units;
in which:
the mass of at least one constituent is calculated by the LAG function as set out above;
the computing unit is capable of calculating with the aid of a master algorithm, as a function of the set points of properties, the set points of concentration of reactants in the reactor;
the computing unit is capable of calculating with the aid of a slave algorithm, as a function of the set points of output and of set points of concentration, set points of flow rate for the flows entering the reactor, these set points of flow rate being transmitted as input set points to the units for controlling flow rates;

the measurements carried out by the units for measuring flow rates are involved as additional inputs into the said slave algorithm, to enable the latter to calculate predictions of concentrations as a function of these measurements of flow rates, these predictions of concentrations being involved in the master algorithm for calculating predictions of properties employed as additional inputs into the calculation of the set points of concentrations.

The invention also relates to a control device as described above, in which:
the synthesis equipment additionally includes:
units for heat control capable of controlling the temperature in the reactor, and
temperature sensors;
the master algorithm is capable of calculating, as a function of the set points of properties, set points of temperatures for the reactor;
the slave algorithm is capable of:
calculating a heat balance for the reactor,
solving this or these heat balance(s) so as to determine the heat which must be added to, or withdrawn from, the synthesis in order to conform to the set points of temperature, and
deriving from this or these heat balance(s) input set points for the units for heat control of the reactor, and
receiving, as additional input variables, the measurements performed by the temperature sensors.

The invention also relates to a device as described above, in which measurements performed by the temperature sensors are involved as additional inputs into the master algorithm.

The invention also relates to a device as described above, including:
at least one analyser capable of supplying measurements of the properties involved in the master algorithm; and
means for inputting these measurements of properties into the computing unit;
the said computing unit including:
a first prediction unit based on a first direct model of the process permitting the prediction of the properties of the synthesized product as a function of the predictions of concentrations calculated by the slave algorithm;
a first adaptation unit comparing the predictions of properties calculated by the first prediction unit with the values actually measured on the synthesized product and from this comparison deriving adaptation parameters which are involved as additional inputs into the said first prediction unit; and
a first control unit based on a first reverse model, for calculating, as a function of the set points and of the predictions of properties, set points of concentrations for the slave algorithm, the said adaptation parameters also being involved as additional inputs into the said first control unit.

The invention also relates to a device as described above, additionally including:
at least one analyser capable of supplying measurements of concentration of the reactants; and
means for inputting these measurements of concentration into the computing unit;
the said computing unit including
a second prediction unit based on a second direct model permitting the prediction of the concentrations as a function of the material balance in the reactor;
a second adaptation unit comparing the predictions of concentrations calculated by the second prediction unit with the measurements of concentration and from this comparison deriving other adaptation parameters which are involved as additional inputs into the said second prediction unit; and a second control unit based on a second reverse model, for calculating, as a function of the set points of output, set points of concentration calculated by the master algorithm and predictions of concentration from the second prediction unit, set points for the flow rates entering the reactor, the said other adaptation parameters involved as additional inputs into the said second control unit.

Figure 2:
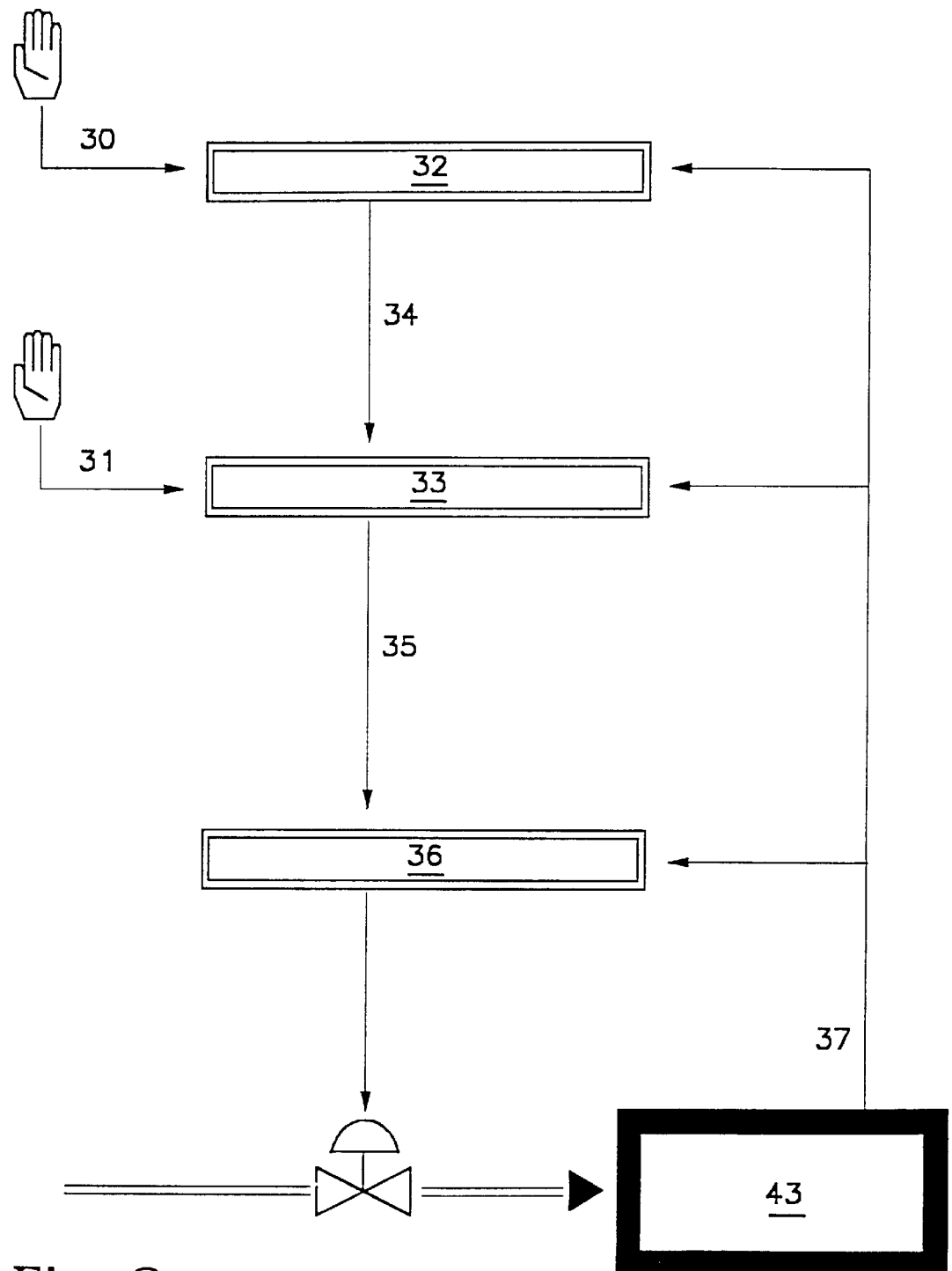
Figure 3:
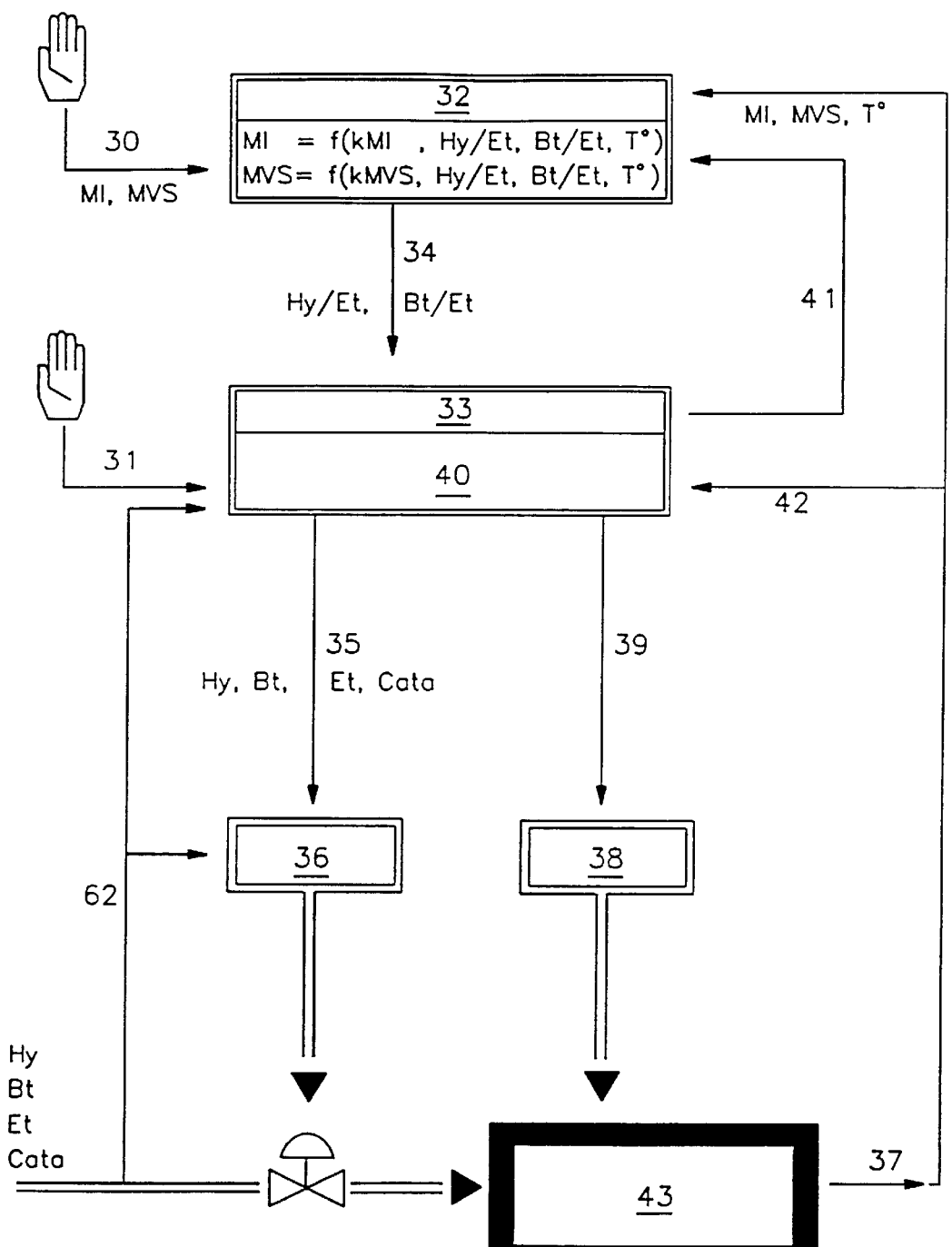
Figure 4:
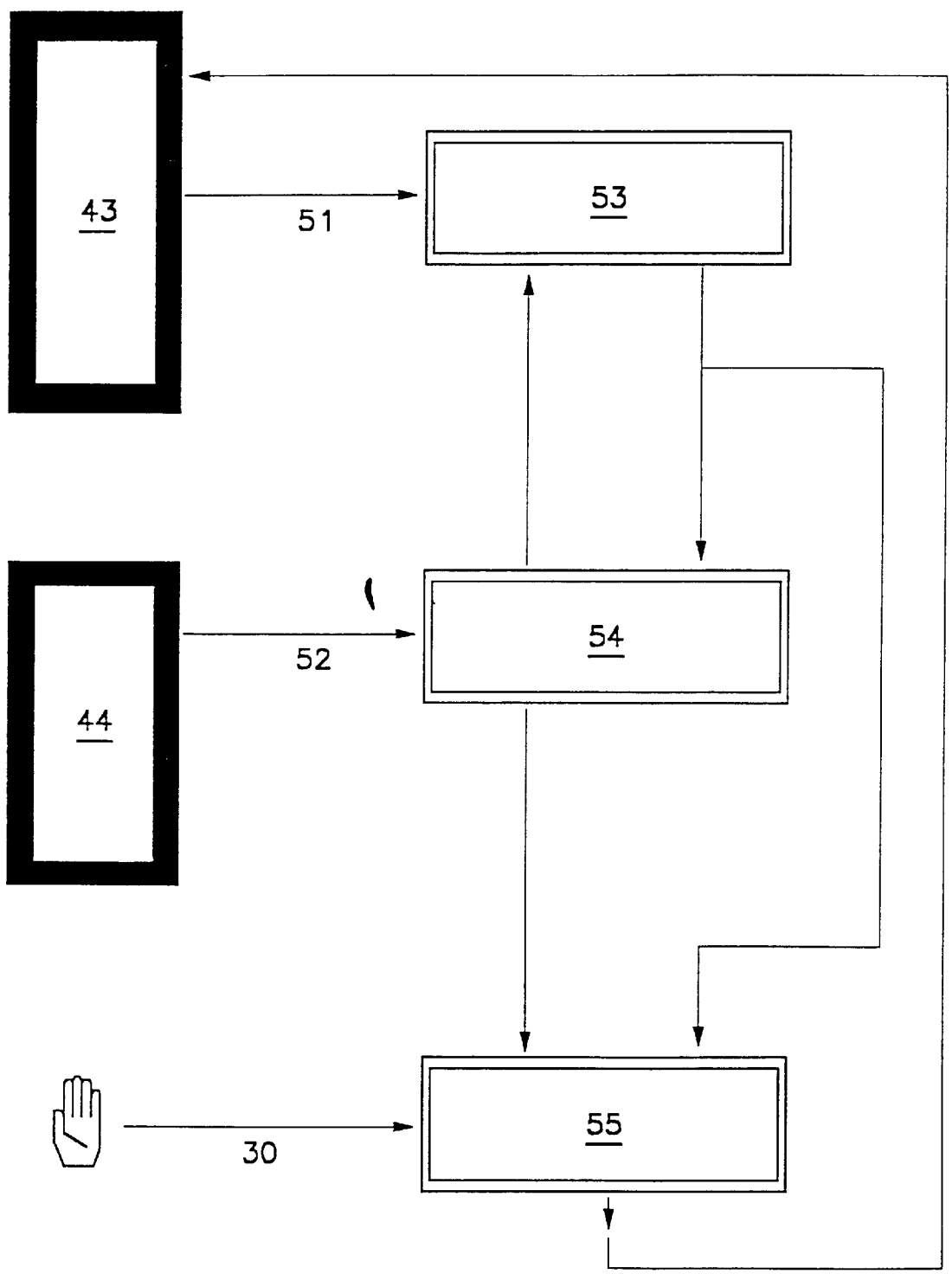
Figure 5:
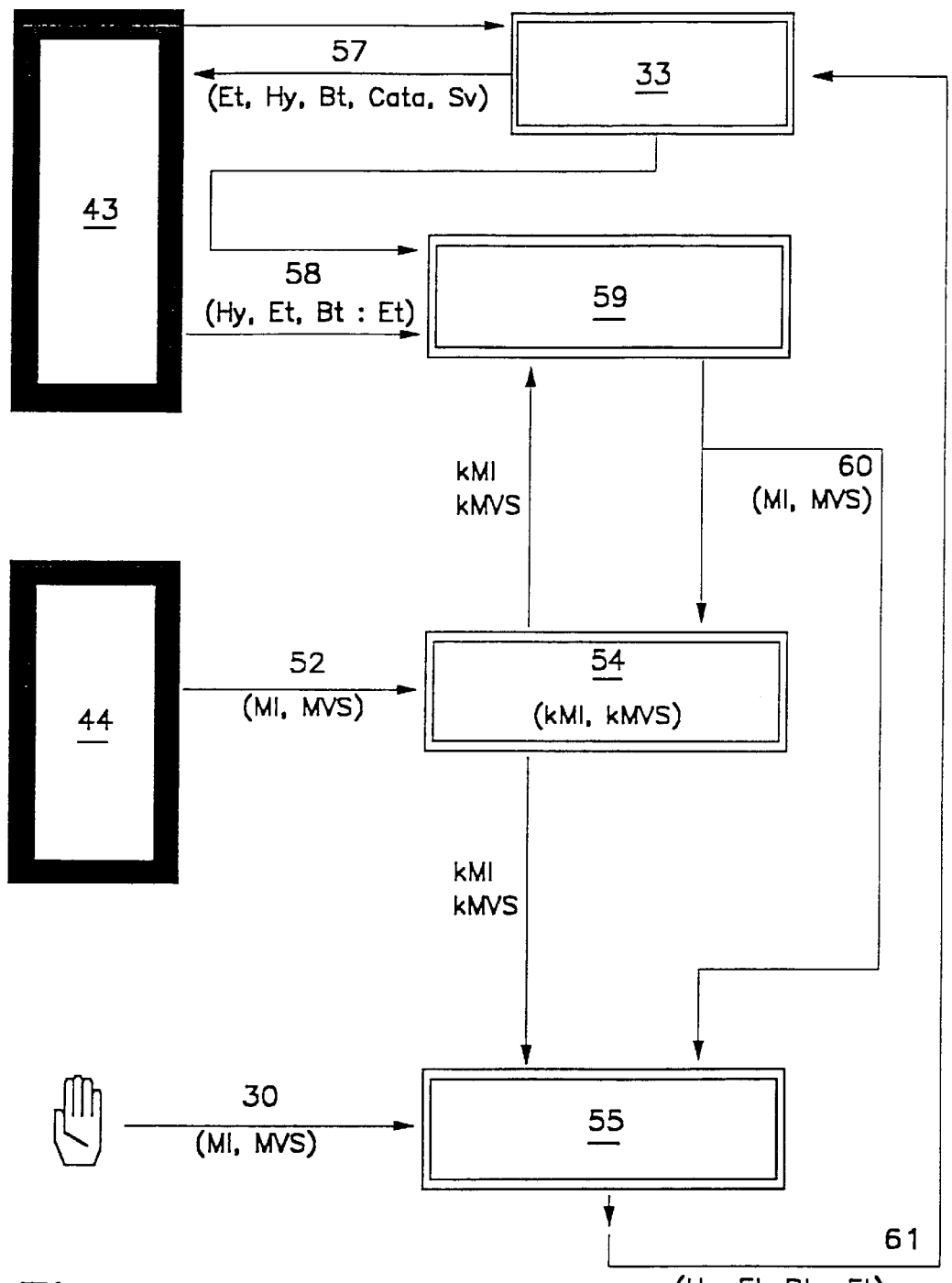
Figure 6:
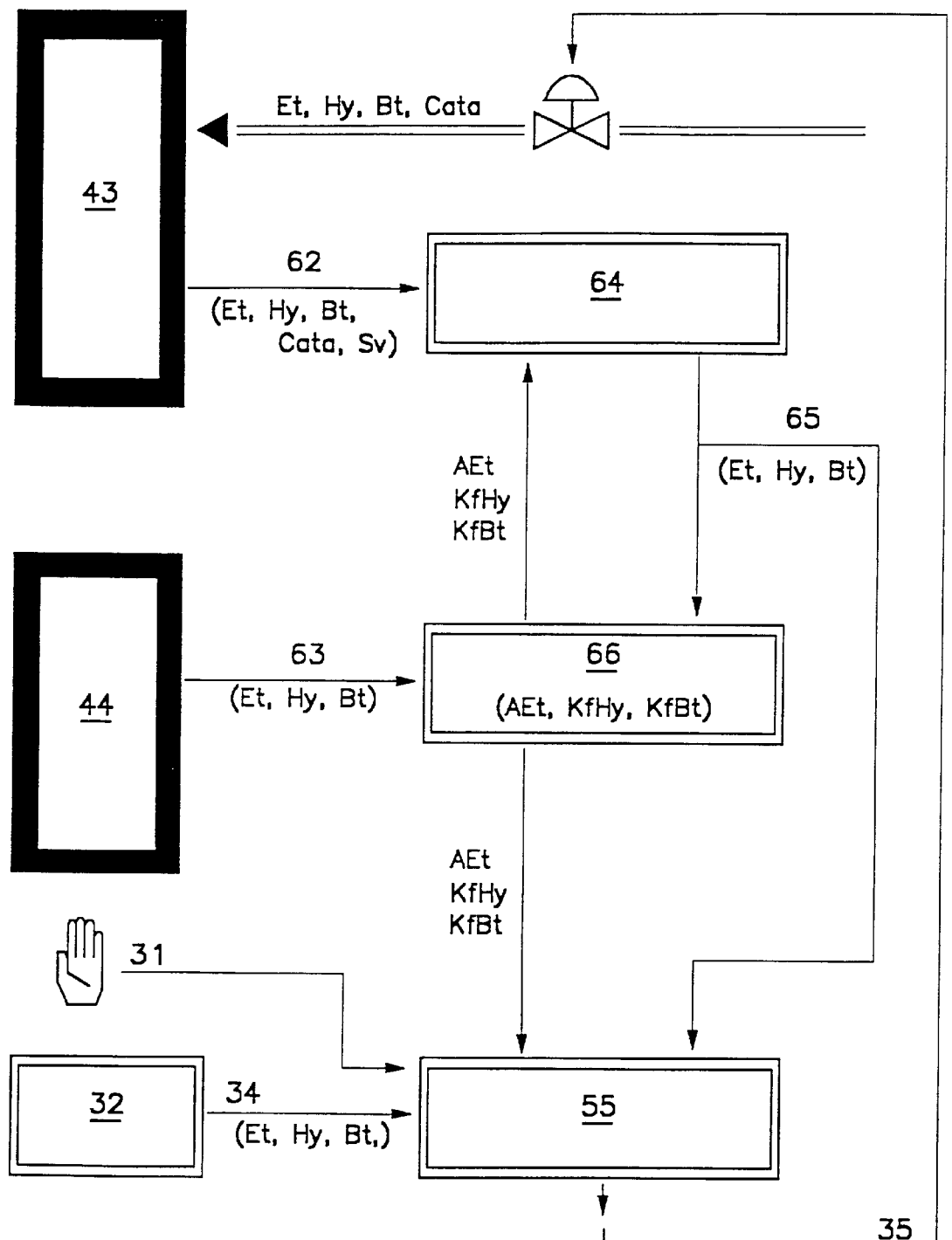
Figure 7:
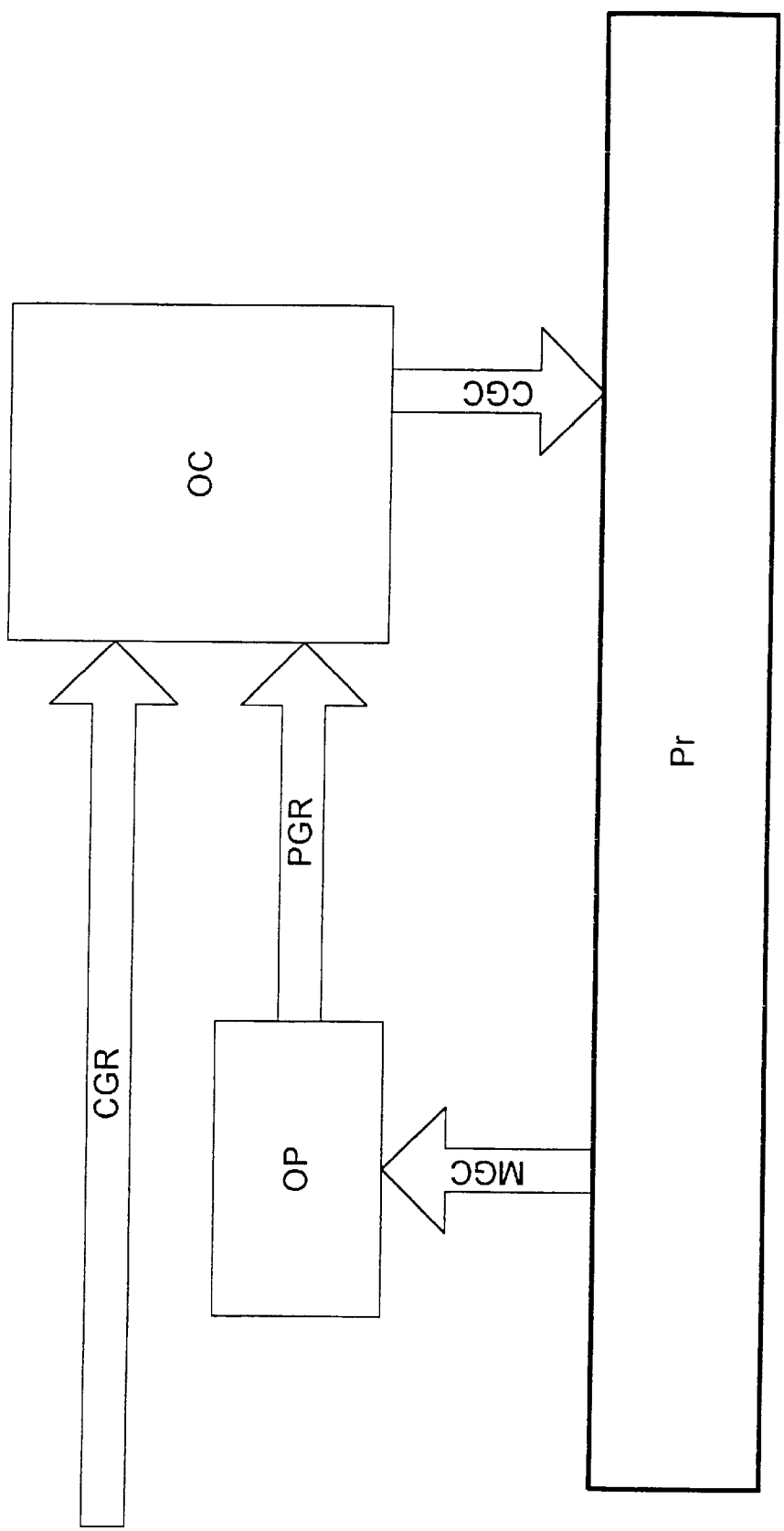
Figure 8:
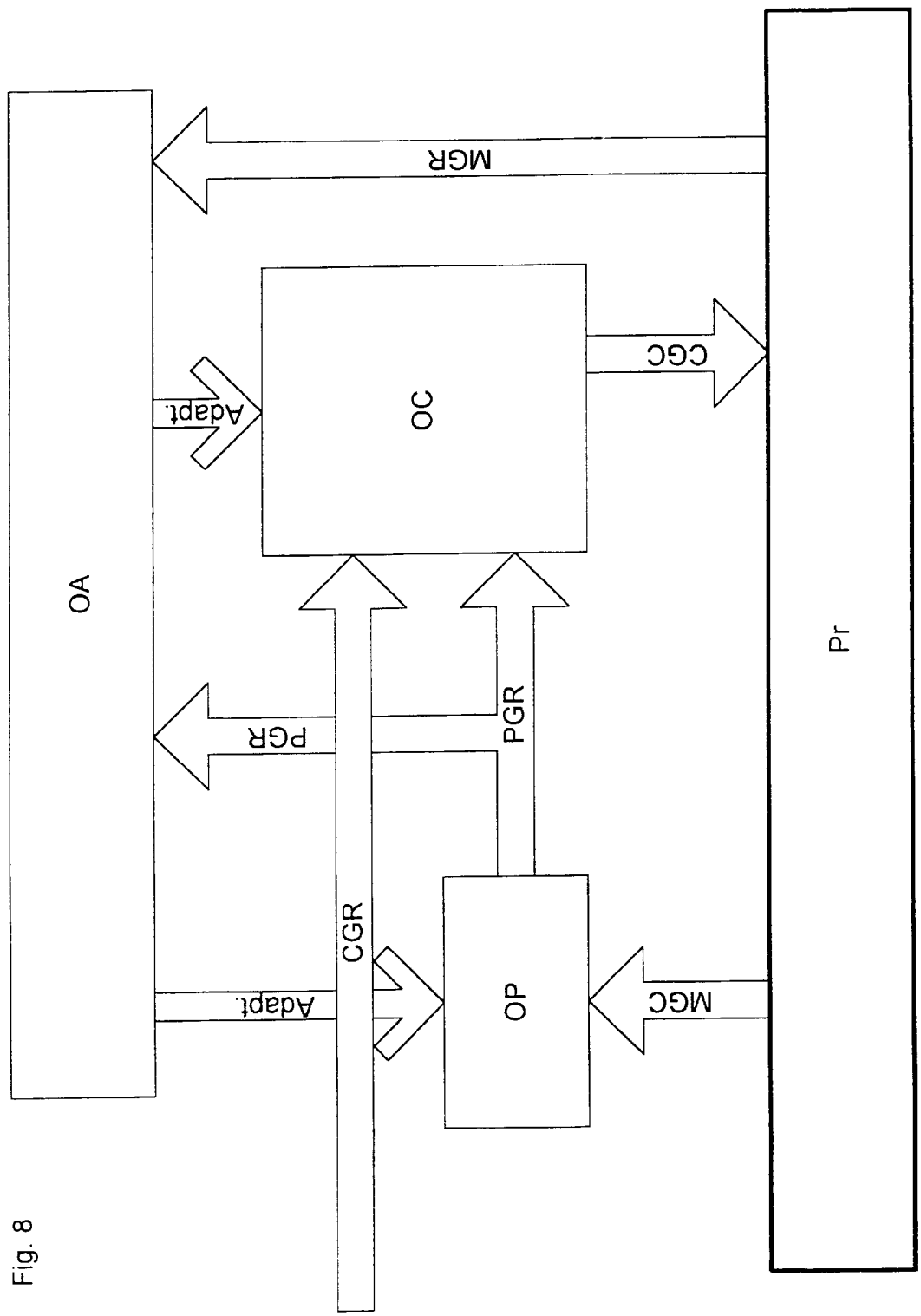
Figure 9:
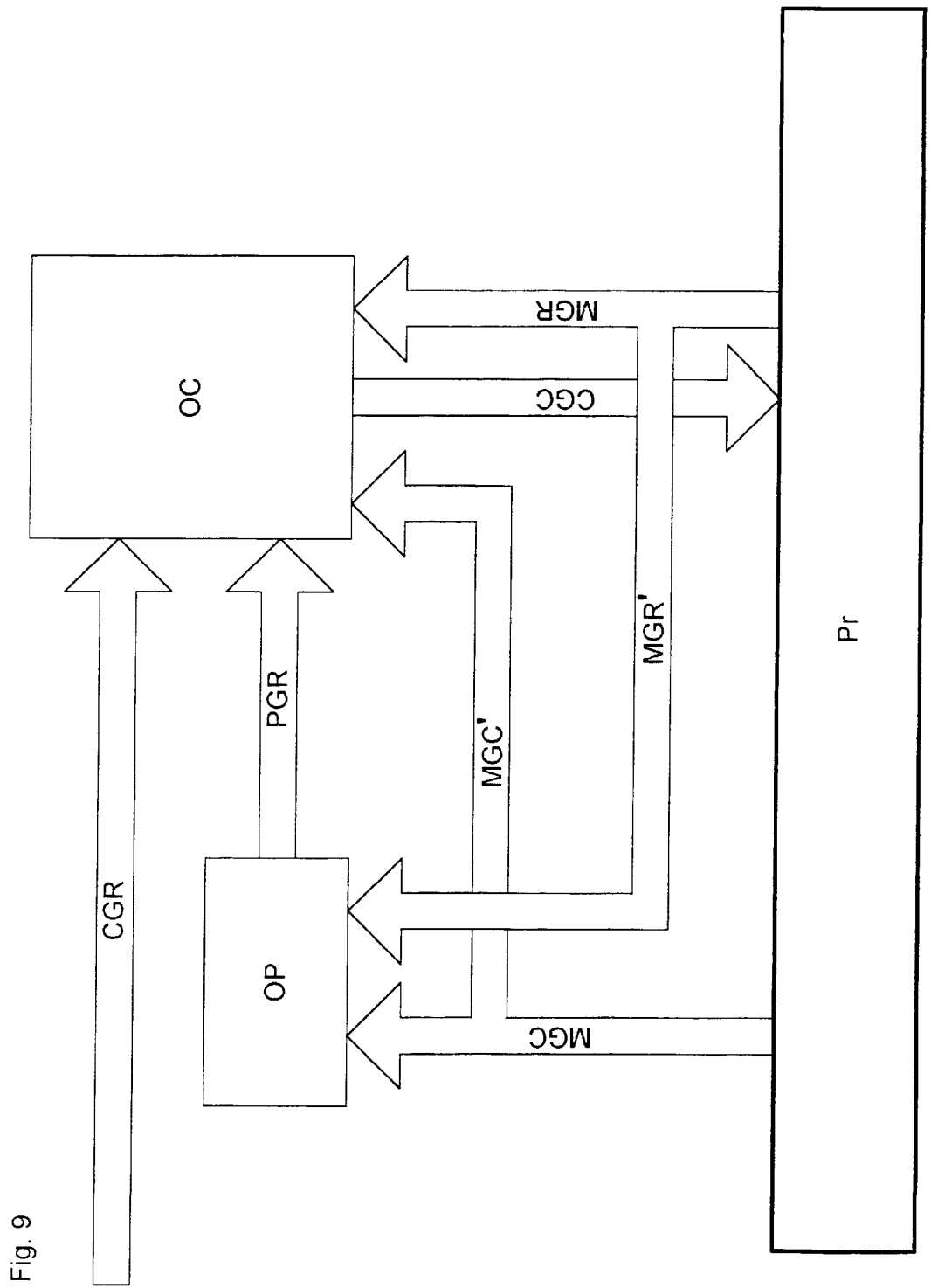
Figure 10:
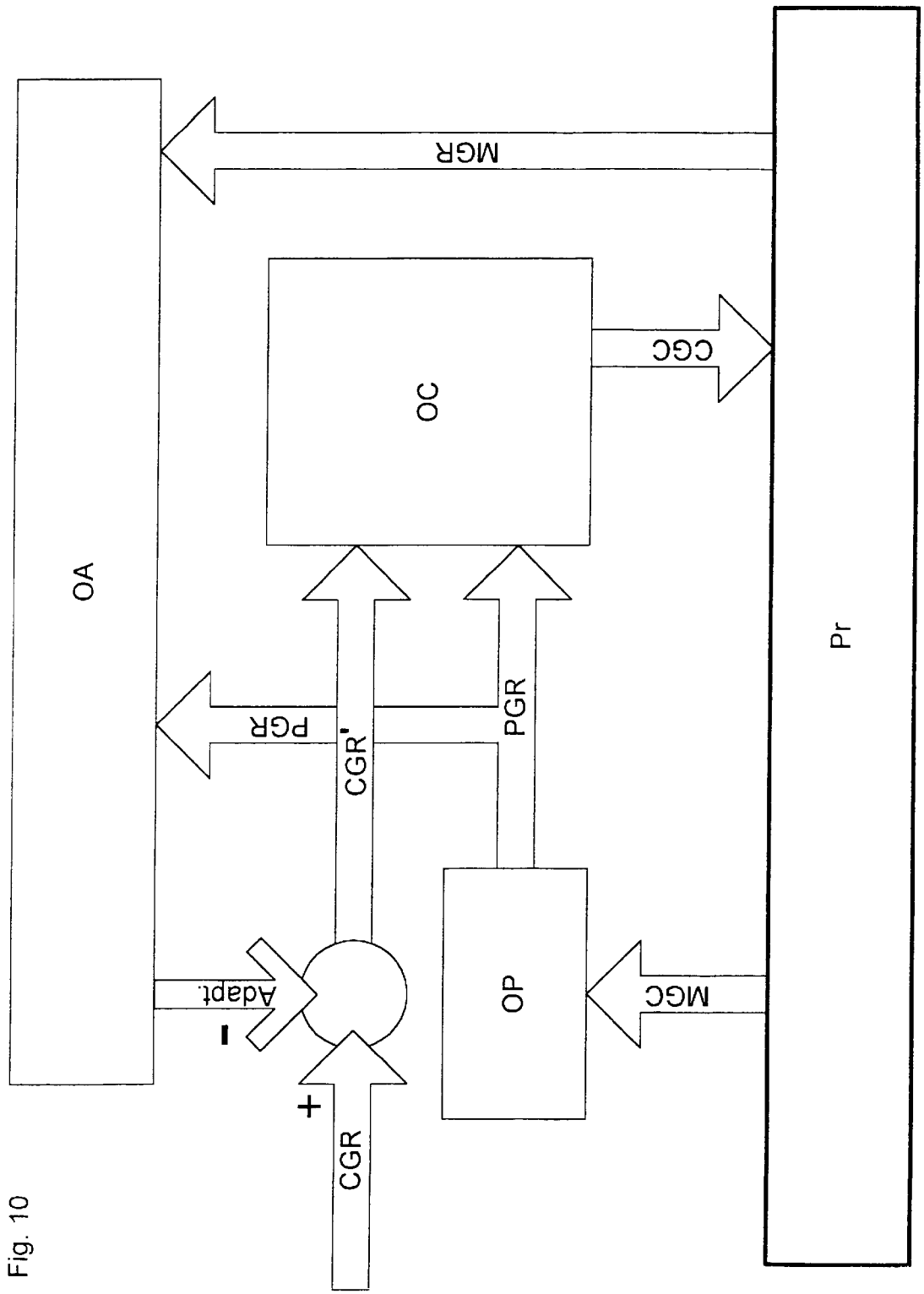

A concrete embodiment of the invention is illustrated on the basis of a process for continuous synthesis of polyethylene (PE), with reference to FIGS. 1 to 10. The latter show:

FIG. 1: a diagram of a circuit for the manufacture of polyethylene;

FIG. 2: a simplified diagram of the structure of an advanced control according to the invention;

FIG. 3: a basic diagram of the advanced control applied to the manufacturing circuit of FIG. 1;

FIG. 4: a basic diagram of an algorithm for adaptive control as employed in the advanced control system according to FIG. 2;

FIG. 5: a diagram of the structure of the master algorithm in the advanced control system according to FIG. 2;

FIG. 6: a diagram of the structure of the slave algorithm in the advanced control system according to FIG. 2;

FIG. 7: the general diagram of a control method in accordance with the invention;

FIGS. 8–10: the diagram of particular alternative forms of the method of the invention.

In FIG. 7 there can first of all be seen the actual process of synthesis (Pr), which can be controlled by applying at least one set point of a manipulated variable (CGC) (for example one or more flow rates of constituents entering the reactor, a temperature, and the like) to a suitable actuator (valve, heating or cooling device, and the like). The control is performed by means of a control unit (OC) based on the reverse mathematical model of the process and the chief function of which is to compare the set point(s) of the controlled variables (CGR) (for example one or more properties of the product to be synthesized and/or one or more variables related to the course of the process) with the prediction(s) of these variables (PGR). The prediction or predictions of the controlled variables (PGR) are calculated by a prediction unit (OP) based on the direct mathematical model of the process, on the basis of measurements of the manipulated variables (MGC). It will be noted that no measurement of property(ies) of the synthesized product is involved in the control.

FIG. 8 shows an alternative form of the method of FIG. 7, in which the mathematical model of the process is periodically adapted by an adapting unit (OA) on the basis of the deviation (advantageously filtered or treated digitally) between the predictions (PGR) and the measurements (MGR) of the controlled variables. A resynchronization (shifting in time) of these measurements and of these predictions is often necessary, for example when they concern measurements of properties of the synthesized product which take a long time to obtain. The adaptation unit (OA) transmits the results of its calculations, that is to say its adaptation instructions, to the prediction unit (for adapting the direct model of the process) and to the control unit (for adapting the reverse model of the process). It will be noted that the measurement(s) of property(ies) of the synthesized product are taken into account only in the adaptation process, which generally takes place at a much lower frequency than the normal control process. The possible slowness of these measurements has therefore no direct effect on the quality of the control.

FIG. 9 shows another alternative form of the invention, in which one or more measurements of controlled variables ($M_{GR}$) are taken into account by the control unit (OC), and one or more measurements of controlled variables ($M_{GR}'$) (possibly different) are taken into account by the prediction unit (OP). Similarly, one or more measurements of manipulated variables ($M_{GC}'$) can additionally be taken into account by the control unit (OC).

It is obvious that it would be possible to create another alternative form of the method of the invention by combining the alternative forms of FIGS. 8 and 9, that is to say by using at the same time an adaptation unit and by taking into account one or more measurements of manipulated variables in the control unit, and/or one or more manipulated variables in the prediction unit and/or in the control unit.

In FIG. 10 the mathematical model of the process is not adapted in the proper sense of the term, but the deviation (advantageously filtered) between the measurements and the predictions of the controlled variables is used to correct the set points of the controlled variables ($C_{GR}$). In these circumstances this correction has here been shown as a simple difference: a corrective term calculated by the adaptation unit OA (which is in fact here only a correction unit) is subtracted from each of the set points of controlled variables, and this provides corrected set points $C_{GR}'$, transmitted to the control unit OC. It is obvious that in some cases the correction may involve operations which are more complex than a subtraction, for example a division (in this case it is possible, however, to return to a subtraction by considering the logarithms of the variables considered). This method is commonly called Internal Model Control (IMC).

If reference is made to FIG. 1, which shows diagrammatically a circuit for continuous synthesis of polyethylene (PE), the polymerization of ethylene takes place in a loop reactor 10, in suspension in a suitable solvent such as, for example, hexane. The process is continuous, that is to say that the reactants are injected continuously and that a part of the content of the reactor 10 is continuously drawn off. A circulation pump (not shown) ensures the homogeneity of the content of the reactor 10.

The reactants introduced into the reactor are ethylene "Et", hydrogen "Hy" and butene "Bt" (cf. reference 11). A catalyst is also injected continuously. It is important to have good control of the concentrations of the reactants in the reactor, because the properties of the PE resin are determined chiefly by the concentration ratios Hy/Et and Bt/Et.

The polymerization temperature in the reactor is an additional parameter which affects the properties of the PE resin. Since the polymerization reaction is highly exothermic, the temperature of the reactor must be controlled by the use of a cooling circuit 12.

The reactor 10 in operation therefore contains solvent, polymer and reactants which have not yet reacted and catalyst. Its content is drawn off continuously through the withdrawal pipe 14. This drawn-off content enters a stripper STP 16, which separates the PE polymer and the fluids (solvent and reactants). These fluids are vaporized by steam injection and are removed into a condenser CD 18. In the latter the solvent is again condensed before being recycled. The reactants which are lighter are separated from the solvent and are also recycled. A gas phase chromatograph GC (20) placed at the exit of the condenser 18 allows the reactant concentrations Hy/Et and Bt/Et to be determined.

The polymer removed from the stripper 16 is concentrated in a centrifuger CFG 22, and then dried in a fluidized bed drier SHLF 24, before being sent to the finishing to be granulated therein. Samples are taken at the exit of the drier 24 in order to measure the properties of the resin in it: crystallinity (measured via the specific density "SD") and rheological properties (melt index (MI) or melt flow index (MFI) and melt viscosity "$\mu_2$", measured in a capillary flow under a shear of 100 s$^{-1}$).

The dynamics of this PE synthesis process are slow and complex:

The loop reactor 10 behaves as a perfectly mixed reactor. Consequently, any change in the feed flow rate of one of the reactants will be reflected only gradually in the concentration of this reactant in the reactor. This is because the new flow rate must be mixed with the entire volume of the reactor 10 in order to bring it to the new equilibrium concentration.

The measurement of the concentrations of the reactants is done by a gas phase chromatograph 20; this is a noncontinuous instrument which works in successive steps: taking a sample of gas, analysis and then derivation of the results. There is therefore a dead time (from 5 to 15 min) between the changes in concentration and their measurement.

The properties of the polymer manufactured at any instant depend chiefly on the concentrations of the reactants. Any change in these concentrations therefore instantly affects the properties of the polymer manufactured. On the other hand, the average properties in the reactor change only gradually because the freshly produced polymer must mix with the polymer already present in the reactor 10 (residence time: ±2 h).

When the polymer is drawn off from the reactor 10, it again undergoes a series of mixings in the various units of equipment (STP, CFG and SHLF) intended to dry it (residence time: ±2 h). Samples of polymer are then taken and analysed by the works laboratory. The results of these analyses will therefore be communicated to the manufacturer only after a new dead time, which may be considerable (±2 h).

Modelling of the Process with the Aid of an LAG Function

According to the method of the invention the dynamic modelling of a process of continuous synthesis is carried out by resorting to assumptions of perfect mixings and of pure delays. The perfect mixings are expressed as an equation by means of a function which is well known to engineers, the "LAG" function, or low-pass filter (of the 1st order); this function is linear and easily programmable. It is defined as follows: y=LAG (u, $\tau$) (known as "LAG of u during $\tau$") as being the solution of the differential equation $$u = \tau \cdot \frac{dy}{dt} + y$$

in which the arguments u and $\tau$ vary with time.

This equation can be solved numerically (even in real time) by an algebraic equation of the 1st order, which has the following variables as arguments:

the sampling period "T" (or time elapsed since the last iteration)
the residence time (or time "constant") "$\tau$" at the instant "t"
the state variable "y" at the preceding instant "t–T"
the control variable "u" at the present instant "t" (u and $\tau$ in fact represent the values measured or calculated at the instant "t" on the variables "u" and "$\tau$", which are assumed to have been constant throughout the preceding interval "T").

T is preferably small in relation to $\tau$ (for example at least 10 times smaller), so as to increase the precision of the calculation.

The solution of the abovementioned equation can be calculated, for example, by the following formula:

$$y(t)=y(t-T)\cdot e^{-T/\tau(t)}+u(t)\cdot(1-e^{-T/\tau(t)})$$

or else, more simply (approximately):

$$y(t) = \frac{y(t-T) + u(t)\cdot \dfrac{T}{\tau(t)}}{1 + \dfrac{T}{\tau(t)}}$$

The modelling of the process with the aid of the LAG function is based on the following theorems:

Let there be a perfectly mixed reactor (CSTR) of volume $V_R$. It is fed with various constituents (reactants or inerts), including the reactant "x" (entry flow rate $FX_{IN}$) which has the property "$Px_{IN}$" at the entry. The exit flow rate "$F_{OUT}$" (draw-off) is also measured.

Theorem 1

Application of the LAG method to the calculation of a mass balance:

At each instant the mass "$Mx_R$" of a constituent "x" in a perfectly mixed reactor (CSTR) is equal to the LAG of the product of the entry mass flow rate "$Fx_{IN}$" multiplied by a time "$\tau_X$", during this same time "$\tau_X$":

$$Mx_R=LAG(Fx_{IN}\cdot\tau_X,\ \tau_X)(\text{in kg})$$

The time "$\tau_X$" is the "residence time of x"; its value is the mass of the constituent $Mx_R$, divided by the sum of the "leaving" mass flow rates (quantity consumed by the reaction "FRx", flow rate leaving the reactor "$Fx_{OUT}$", and so on).

$$\tau_X=Mx_R/Fx_{OUT}+FRx+\text{etc.})(\text{in h})$$

This theorem thus gives an accurate method for the dynamic calculation (even in real time) of the concentrations in a perfectly mixed reactor. In fact, if "$V_R$" is the reactor volume, the concentration "$Cx_R$" of the constituent "x", expressed in kg/m$^3$, has the value $$Cx_R=Mx_R/V_R(\text{in kg/m}^3)$$

Since the total volume flow rate "$FV_{OUT}$" leaving the reactor is known, the residence time of the reactor "$\tau_R$" is defined:

$$\tau_R=V_R/FV_{OUT}$$

Hence, the mass flow rate "$Fx_{OUT}$" of the constituent "x" leaving the reactor (draw-off) is:

$$Fx_{OUT}=Mx_R/\tau_R$$

It will be noted that if "x" is an inert (which does not undergo reaction and leaves the reactor only by draw-off), this gives:

$$\tau_X=\tau_R$$

Furthermore, in the frequent case where the rate of reaction of "x" is proportional to its concentration $Cx_R$, with a proportionality factor $R_X$, this gives: $FRx=R_X\cdot Mx_R$ and hence $$\tau_X=1/(R_X+1/\tau_R)$$

Theorem 2

Application of the LAG method to the calculation of a property of a mixture:

Let there be a property "Px" of a constituent, obeying the linear mixing law:

$$Px_{1+2} = w_1 \cdot Px_1 + w_2 \cdot Px_2$$

where $w_1$ and $w_2$ are the mass fractions of property $Px_1$ and $Px_2$ (with $w_1+w_2=1$).

At each instant the property $Px_R$ in a perfectly mixed reactor (CSTR) is equal to the LAG of the property at the entry $Px_{IN}$, during a residence time which has the value of the mass ratio $Mx_R$ of the constituent in the reactor divided by the entering mass flow rate (and/or appearing by reaction) $Fx_{IN}$:

$$Px_R = LAG(Px_{IN}, Mx_R/Fx_{IN})$$

It is thus possible to take the dynamics of the process into account and to recalculate its time constants continuously.

As explained above, the "properties" which are involved here can in some cases have undergone a mathematical transformation which makes them linear (for example the logarithm of the melt index of a polymer can be considered as obeying a linear mixing law).

Principle of the Control

When the model of the process of synthesis has been established, an algorithm is required which calculates the parameters necessary for the control of this process.

FIG. 2 shows a simplified general diagram of the type of advanced control (Advanced Process Control or "APC") adopted for the polymerization process described above. It is seen that this control system includes a cascade of two algorithms, this cascade steering especially the PID controllers of the reactant feed flow rates.

The two algorithms in cascade, also called master algorithm and slave algorithm, are both adaptive dynamic algorithms based on models originating from the knowledge of the process, (in contrast to empirical models), which are based especially on the material balances and the kinetics of the controlled process. They employ the predefined LAG function.

In FIG. 3, which shows the principle of the control system in the context of the polymerization process described above, it is seen that:

the master algorithm is based on the characteristic equations of the catalysts, that is to say equations which give the properties of the PE as a function of the polymerization temperature and of the concentrations of the reactants in the reactor; it provides the slave algorithm with the set points of the concentrations of reactants to satisfy the set points for the properties of the PE;

the slave algorithm is based on a material balance and the chemical kinetics of the reactions; it provides the feed flow rate controllers with the set points of flow rates of reactants which are necessary to satisfy the set points of concentrations imposed by the master algorithm and the set point of the production rate of the process. Preferably it also calculates an anticipative ("feed-forward") term for the set point of temperature, improving the temperature control during changes in production rate.

This type of control is perfectly precise only if the model is perfect and takes into account all the possible perturbations. In general this is not the case. This is why in general (see FIG. 4) the direct model (and the reverse model) is continuously adapted by comparing the predictions with the measurements of the properties. This "adaptation" of the model allows its precision to be maintained in the presence of perturbations which are not modelled and thus makes it possible to obtain a more precise control in all circumstances.

The Slave Algorithm

FIG. 6 illustrates the principle of the slave algorithm:

1. a prediction unit using a direct model of the predicted process, from the measurements of the flow rates feeding the reactor and the reactant and polymer concentrations;
2. an adaptation unit compares the concentrations of ethylene (Et), hydrogen (Hy) and butene (Bt) measured by an analyser (gas chromatograph) with the values predicted by the direct model, so as to determine three adaptation parameters:

the specific activity of the catalyst for ethylene "AEt", in kg/h of polyethylene per kg of catalyst and per kg/m$^3$ of ethylene the gain error in the measurement of flow rate of hydrogen "KfHy"

the purity of the butene feed "KfBt";
3. the control unit calculates the set points for the feed flow rates of the reactants, from set points of concentration calculated by the master algorithm and from the set point of production rate; these set points of flow rate are made up of a feed-forward based on the reverse model and of a feedback proportional to the deviation between the direct model and the set points of concentration.

To understand the calculations performed by the slave algorithm, in the case of a process for the synthesis of polyethylene, it must be known first of all that it is generally accepted that the rate of polymerization "$VitP_{Et}$" is proportional:

to the concentration of unpolymerized Et $cEt_R$ (in kg/m$^3$), to the concentration of active catalyst in the reactor $cCA_R$ (in kg/m$^3$), and to a proportionality factor, a function (which is difficult to quantify) of the temperature, of the concentrations of Hy, of Bt and of cocatalyst, of the presence of poisons, and the like. This term is called "catalytic activity" for ethylene $A_{Et}$. In the absence of a major malfunction, (poison, and the like), it varies relatively little in the course of a campaign.

$$VitP_{Et} = A_{Et} \cdot cCA_R \cdot cEt_R \text{ (kg/m}^3 \text{ h)}$$

If $V_R$ is the volume of the reactor, the quantity of ethylene "FpEt" which polymerizes in the reactor at each unit of time ("polymerization flow rate") is therefore:

$$\begin{aligned} FpEt &= VitP_{Et} \cdot V_R \quad \text{(kg/h)} \\ &= A_{Et} \cdot cCA_R \cdot MEt_R \end{aligned}$$

where $MEt_R$ is the mass of ethylene in solution in the reactor (in kg).

It is known furthermore that the rate of incorporation of Hy is approximately 100 times slower than that of Et and 10 times slower for Bt. This gives:

$$FpHy = A_{Et} \cdot cCA_R \cdot MHy_R / 100$$

$$FpBt = A_{Et} \cdot cCA_R \cdot MBt_R / 10$$

where $MHy_R$ is the mass of hydrogen in solution in the reactor (in kg) and $MBt_R$ is the mass of butene in solution in the reactor (in kg).

The slave model now uses the following measurements:

$FEt_{IN}$=ethylene (monomer) feed flow rate (kg/h)

$FSv_{IN}$=solvent (hexane) feed flow rate (kg/h)
$FCA_{IN}$=catalyst feed flow rate (kg/h)
$FHy_{IN}$=hydrogen (transfer agent) feed flow rate (kg/h)
$FBt_{IN}$=butene(comonomer) feed flow rate (kg/h)

It also uses the following adaptation parameters:

$A_{Et}$="catalytic activity" for ethylene
KfHy=gain error in the measurement of the hydrogen feed
KfBt=purity of the butene feed.

The following calculations are performed sequentially, in the following order, at a high frequency (the time interval separating each iteration being small in relation to the shortest of the residence times $\tau_x$).

Since the reactor volume is constant, the leaving flow rate per unit volume is equivalent to the entering flow rate per unit volume (noncompressible fluids). The leaving flow rate per unit volume "$Fv_{OUT}$" can therefore be calculated as the sum of the entering mass flow rates divided by the density which they have in the reactor $$FV_{OUT}=FSv_{IN}/650+FEt_{IN}/950+FBt_{IN}/600 \text{ (m}^3\text{/h)}$$

(where the densities are the following: 650 kg/m³ for the solvent, 950 kg/m³ for the polyethylene, 600 kg/m³ for butene). It is assumed here that all the ethylene is instantly converted to polyethylene and the flow rate of hydrogen and of catalyst (a few kg) is ignored.

The solvent is chemically inert and leaves the reactor only by being drawn off from the reactor. Its mass "$MSv_R$" in the reactor is calculated by employing theorem 1:

$$\tau_R=V_R/FV_{OUT} \text{ (h) (residence time in the reactor)}$$

$$MSv_R=LAG(FSv_{IN}\cdot\tau_R, \tau_R) \text{ (kg)}$$

The catalyst is deactivated with a time constant "kd"; the mass "$MCA_R$" of the active catalyst in the reactor is calculated as follows:

$$\tau_{CA}=1/(1/\tau_R+kd) \text{ (h)}$$

$$MCA_R=LAG(FCA_{IN}\cdot\tau_{CA}, \tau_{CA}) \text{ (kg)}$$

and therefore the concentration "$cCA_R$" of active catalyst in the reactor is:

$$cCA_R=MCA_R/V_R \text{ (kg/m}^3\text{)}$$

Ethylene "leaves" the reactor in the draw-off flow and in the polymerization reaction. Its mass in the reactor "$MEt_R$" is calculated as follows:

$$\tau_{Et}=1/(1/\tau_R+A_{Et}\cdot cCA_R) \text{ (h)}$$

$$MEt_R=LAG(FEt_{IN}\cdot\tau_{Et}, \tau_{Et}) \text{ (kg)}$$

The "raw" (uncalibrated) mass of hydrogen in the reactor "$MHy_{RAW}$" is calculated similarly:

$$\tau_{Hy}=1/(1/\tau_R+A_{Et}\cdot cCA_R/100) \text{ (h)}$$

$$MHy_{RAW}=LAG(FHy_{IN}\cdot\tau_{Hy}, \tau_{Hy}) \text{ (kg)}$$

The mass "$MHy_R$", corrected to take into account the gain error in the measurement of the hydrogen feed, is:

$$MHy_R=KfHy\cdot MHy_{RAW} \text{ (kg)}$$

The ratio Hy:Et in the reactor is therefore:

$$HyEt_R=MHy_R/MEt_R$$

The mass of "raw" butene "$MBt_{RAW}$" is calculated similarly:

$$\tau_{Bt}=1/(1/\tau_R+A_{Et}\cdot cCA_R/10) \text{ (h)}$$

$$MBt_{RAW}=LAG(FBt_{IN}\cdot\tau_{Bt}, \tau_{Bt}) \text{ (kg)}$$

The mass "$MBt_R$", corrected to take into account the purity of the butene feed, is:

$$MBt_R=KfBt\cdot MBt_{RAW} \text{ (kg)}$$

The ratio Bt:Et in the reactor is therefore:

$$BtEt_R=MBt_R/MEt_R$$

As already shown, the polymerization flow rate "FpEt" (instantaneous production rate) is:

$$FpEt=A_{Et}\cdot cCA_R\cdot MEt_R \text{ (kg/h)}$$

Since the polymer is inert and does not undergo reaction, its mass in the reactor "$MPE_R$" is:

$$MPE_R=LAG(FpEt\cdot\tau_R, \tau_R) \text{ (kg)}$$

The flow rate of polymer leaving the reactor "$FPE_{OUT}$" is therefore:

$$FPE_{OUT}=MPE_R/\tau_R \text{ (kg/h)}$$

Adaptation of the Slave Model

The adaptation block employs an analyser (for example a gas chromatograph "GC") to obtain the measurements for the concentrations in the reactor of ethylene "$cEt_{GC}$", of hydrogen "$cHy_{GC}$" and of butene "$cBt_{GC}$" (expressed, for example, in kg/m³). These measurements are compared with the values predicted by the direct model in order to determine the following three adaptation parameters:

the specific activity of the catalyst for ethylene "AEt", in kg/h of polyethylene per kg of catalyst and per kg/m³ of ethylene the gain error in the measurement of hydrogen flow rate "KfHy"

the purity of the butene feed "KfBt".

The gas chromatograph supplies sampled measurements with a delay of approximately 6 minutes.

The calculation of the specific activity for ethylene "AEt" ensues from the following equalities:

$$\begin{aligned}
cEt_{GC} &= cEt_R \quad (\text{kg/m}^3)\\
&= MEt_R/V_R\\
&= LAG(FEt_{IN}\cdot\tau_{Et}, \tau_{Et})/V_R\\
&= LAG(FEt_{IN}/(1/\tau_R+A_{Et}\cdot cCA_R), \tau_{Et})/V_R\\
\Rightarrow A''_{Et} &= (FEt_{IN}/LEAD(cEt_{GC}\cdot V_R, \tau_{Et})-1/\tau_R)/cCA_R
\end{aligned}$$

Since the measurement $cEt_{GC}$ is sampled and noisy, it is undesirable to find it in a LEAD; it is therefore preferable to employ:

$$A_{et}'=LAG(A_{Et}'', \tau_{Et})\approx LAG(FEt_{IN}/cCA_R, \tau_{Et})/(cEt_{GC}\cdot V_R)-1/LAG(\tau_R\cdot cCA_R, \tau_{Et})$$

Account is taken of the delay of 6 minutes in the measurement of $cEt_{GC}$ by introducing two LAGs in series of 3 minutes each into the values of the model, and the final formula is obtained:

$$A_{et}=LAG(FEt_{IN}/cCA_R, \tau_{Et}, 3/60, 3/60)/(cEt_{GC}\cdot V_R)-1/LAG(\tau_R\cdot cCA_R, \tau_{Et}, 3/60, 3/60)$$

The calculation of the gain in the hydrogen flow rate "KfHy" ensues from the following equalities:

$$cHy_{GC} = cHy_R \quad (kg/m^3)$$
$$= MHy_R / V_R$$
$$= KfHy \cdot MHy_{RAW} / V_R$$
$$\Rightarrow KfHy = cHy_{GC} \cdot V_R / MHy_{RAW}$$

Account is taken of the delay of 6 minutes in the measurement of $cHy_{GC}$ by introducing two LAGs in series of 3 minutes each into the value of the model, and the final formula is obtained:

$$\rightarrow KfHy = cHy_{GC} \cdot V_R / LAG(MHy_{RAW}, 3/60, 3/60)$$

In the same way as for KfHy, the correction parameter is calculated for the butene purity "KfBt":

$$KfHy = cBt_{GC} \cdot V_R / LAG(MBt_{RAW}, 3/60, 3/60)$$

The control algorithm has, as inputs:
the set points of concentration which are calculated by the master algorithm; more precisely, the set points for the concentration ratios $cHy_R/cEt_R$ "$HyEt_{SP}$" and $cBt_R/cEt_R$ "$BtEt_{SP}$" (in kg/kg)
the set point for the production rate of the process $FpEt_{SP}$, fixed by the operator
the set point for the ethylene concentration $cEt_{SP}$, fixed by the operator;
the concentrations calculated by the model.

It calculates the set points for the feed flow rates of the reactants $FEt_{SP}$, $FCA_{SP}$, $FHy_{SP}$ and $FBt_{SP}$. Various algorithms can be used, including the MBPC (Model Based Predictive Control). They can in general be found to be composed of a feed-forward based on the reverse model and a feedback proportional to the deviation between the direct model and the set points of concentration.

Control of the Ethylene Feed

Feed-forward: value for maintaining the current concentration, based on the inversion of the stationary value of the following equation:

$$MEt_R = LAG(FEt_{IN} \cdot \tau_{Et}, \tau_{Et}) \rightarrow FEt_{FF} = MEt_R / \tau_{Et} \quad (kg)$$

Feedback: proportional to the deviation between the set point $cEt_{SP}$ and the model $$FEt_{FB} = 5 \cdot (cEt_{SP} \cdot V_R - MEt_R)$$

Set point:

$$FEt_{SP} = FEt_{FF} + FEt_{FB}$$

Control of the Catalyst Feed

Feed-forward: value for maintaining the current concentration, based on the inversion of the stationary value of the following equation:

$$MCA_R = LAG(FCA_{IN} \cdot \tau_{CA}, \tau_{CA}) \rightarrow FCA_{FF} = MCA_R / \tau_{CA} \quad (kg)$$

Feedback: proportional to the deviation between the set point $FpEt_{SP}$ and the model, according to the following formula:

$$FpEt = A_{Et} \cdot MEt_R \cdot MCA_R / V_R \rightarrow FCA_{FB} = 5 \cdot (FpEt_{SP}/(A_{Et} \cdot MEt_R/V_R) - MCA_R)$$

Set value:

$$FCA_{SP} = FCA_{FF} + FCA_{FB}$$

Control of the Hydrogen Feed

Feed-forward: value for maintaining the current concentration, based on the inversion of the stationary value of the following equation:

$$MHy_R = LAG(FHy_{IN} \cdot \tau_{Hy}, \tau_{Hy}) \rightarrow FHy_{FF} = MHy_{RAW} / \tau_{Hy} \quad (kg)$$

Feedback: proportional to the deviation between the set point of ratio $HyEt_{SP}$ and the model.

$$FHy_{FB} = 5 \cdot (HyEt_{SP} \cdot MEt_R - MHy_R)$$

Set value:

$$FHy_{SP} = FHy_{FF} + FHy_{FB}$$

Control of the Butene Feed (Similar to Hydrogen)

$$FBt_{FF} = MBt_{RAW} / \tau_{Bt}$$

$$FBt_{FB} = 5 \cdot (BtEt_{SP} \cdot MEt_R - MBt_R)$$

$$FBt_{SP} = FBt_{FF} + FBt_{FB}$$

The equations which precede summarize the equations of the slave algorithm. They are performed every 10 seconds by the digital control and command system (SNCC).

The Master Algorithm

FIG. 5 illustrates the principle of the master algorithm:
1. its prediction unit (based on a direct model) predicts the chief properties of the polymer (MI and SD); for this purpose it uses the measurement of the polymerization temperature, the predictions for the concentrations in the reactor which are supplied by the slave model and the residence times of the PE in the various units of equipment;
2. its adaptation unit compares the measurements of MI and SD, which are performed (also on leaving the drier) either by the measurement laboratory every 2 h or by a continuous analyser, with the values predicted by the direct model, so as to determine the 2 adaptation parameters, which are corrective parameters, multiplicative in the case of the MI and additive in the case of the SD;
3. its control unit (based on a reverse model) calculates the set points for the concentrations in the reactor (ratios Hy:Et and Bt:Et) from the set points of MI and of SD supplied by the operator. As in the case of the slave algorithm, this calculation is made up of a feed-forward based on the direct model and of a feedback proportional to the deviation between the direct model and the operator's set points.

For a given catalyst the properties of the resins in a steady state are functions of the polymerization temperature and of the concentrations of the reactants. Among the various static equations which are taught in the literature, the following equations have been chosen:

$$\log(MI) = a_0 + a_1 \cdot T° + a_2 \cdot \log(Hy/Et) + a_3 \cdot Bt/Et$$

$$SD = b_0 + b_1 \cdot T° + b_2 \cdot (Bt/Et)^{b_3} + b_4 \cdot \log(MI)$$

The parameters $a_0$ to $a_3$ and $b_0$ to $b_4$ are obtained by identification in a steady state, for a number of resins manufactured with the same catalyst.

Furthermore, the various units of equipment encountered by the polyethylene until the time when its properties are measured (reactor, stripper, centrifuge and then drier) can all be assimilated to, as a first approximation, perfectly mixed reactors.

The master algorithm uses the following measurements as inputs:

| | | |
|---|---|---|
| $T_R$ | = temperature at the reactor | (° C.) |
| $V_{stp}$ | = liquid volume in the stripper | |
| | (obtained by level measurement) | (m³) |
| $MI_{MES}$ | = MI (melt index) measurement | |
| $SD_{MES}$ | = SD (Specific Density) measurement | | and the following calculations carried out by the slave algorithm:

FpEt=instantaneous output of polymer (production rate) (kg/h)

$FPE_{OUT}$=flow rate of PE leaving the reactor (kg/h)

| | | |
|---|---|---|
| $MPE_R$ | = mass of PE in the reactor | (kg) |
| $HyEt_R$ | = ratio Hy to Et in the reactor | (kg/kg) |
| $BtEt_R$ | = ratio Bt to Et in the reactor | (kg/kg) |

The raw instantaneous values (before adaptation) of the SD and of the logarithm of the MI ("lMI") are calculated by:

$$SD_{INS}=b_0+b_1 \cdot T_R+b_2 \cdot (BtEt_R)^{b_3}+b_4 \cdot lMI_{INS}$$

$$lMI_{INS}=a_0+a_1 \cdot T_R+a_2 \cdot \log(HyEt_R)+a_3 \cdot BtEt_R$$

The raw average properties at the reactor exit are calculated by employing theorem 2:

$$lMIr=LAG(lMI_{INS}, MPE_R/FpEt)$$

$$SDr=LAG(SD_{INS}, MPE_R/FpEt)$$

In effect:

the properties lMI and SD correspond quite well to a linear law of mixtures the loop reactor may be assimilated to a perfectly mixed reactor the mass flow rate of PE "entering" (appearing in) the reactor is effectively FpEt, the quantity of PE which polymerizes at any instant (production rate).

Raw properties at the measurement: since it is known that there are approximately 500 kg of PE per m³ in the stripper, and if it is assumed that the stripper is a perfectly mixed reactor, the raw properties at the stripper exit are calculated as follows:

$$lMIstp=LAG(lMIr, 500 \cdot Vstp/FPE_{OUT})$$

$$SDstp=LAG(SDr, 500 \cdot Vstp/FPE_{OUT})$$

Since the residence time in the centrifuge is very short, it can be ignored.

The drier is a fluidized bed drier; it continuously contains approximately 1400 kg of PE. It can be assumed that the level in the stripper does not change much and that the flow leaving it is equal to that which enters it. Hence, the flow rate of PE entering the drier is $FPE_{OUT}$. At the exit of the drier, the place where the sample is taken for the property measurement, there are then the following raw values:

$$lMIsh=LAG(lMIstp, 1400/FPE_{OUT})$$

$$SDsh=LAG(SDstp, 1400/FPE_{OUT})$$

The properties after adaptation are obtained by involving the adaptation parameters kMI (multiplicative parameter) and kSD (additive parameter); the reactor exit, stripper and drier properties after adaptation are therefore:

$$MIr_C=kMI \cdot 10^{lMIr}$$

$$SDr_C=kSD+SDr$$

$$MIstp_C=kMI \cdot 10^{lMIstp}$$

$$SDstp_C=kSD+SDstp$$

$$MIsh_C=kMI \cdot 10^{lMIsh}$$

$$SDsh_C=kSD+SDsh$$

Adaptation of the Master Algorithm

Measurements of properties take a certain time to be carried out (±5 min if in-line analyser, ±1 h if performed by the laboratory). To enable the adaptation parameters to be calculated it is therefore necessary to resynchronize (shift in time) the raw predictions from the model with the measurements. This can be done, for example, by means of a shift register (here called "DELAY function"):

$$lMI_{DEL}=\text{DELAY}(lMIsh, \tau_{MI})$$

$$SD_{DEL}=\text{DELAY}(SDsh, \tau_{SD})$$

with $\tau_{MI}$ and $\tau_{SD}$=±5 min or ±1 h, according to whether the measurement is carried out by a continuous analyser or by the laboratory.

At each new measurement of MI or of SD the raw adaptation parameter kMI' or kSD' is recalculated by comparing the resynchronized raw model value with the measured value:

$$kMI'=\log(MI_{MES})-lMI_{DEL}$$

$$kSD'=SD_{MES}-SD_{DEL}$$

These raw values are filtered in order to attenuate the rapid reactions which the possible perturbations (noise) of measurements might inflict on the process:

$$kMI=LAG(kMI', \pm 1 \text{ h})$$

$$kSD=LAG(kSD', \pm 1 \text{ h})$$

Control Unit

The control unit has as set points the values $MI_{SP}$ and $SD_{SP}$, entered by the operator. He calculates the set points for the ratios of the concentrations in the reactor $HyEt_{SP}$ and $BtEt_{SP}$ needed to obtain rapidly the desired properties $MI_{SP}$ and $SD_{SP}$. This calculation is done in 2 steps:

1. from the set points $MI_{SP}$ and $SD_{SP}$ supplied by the operator, and from the values after adaptation of the MI and of the SD in the various units of equipment, the control unit calculates the set points $MIi_{SP}$ and $SDi_{SP}$ for the instantaneous output. These instantaneous set points are made up of a feed-forward and of a feedback proportional to the deviation between the direct model and the operator's set points;
2. the set points for the concentration ratios $HyEt_{SP}$ and $BtEt_{SP}$ are then calculated by inverting the static equation used above for the calculation of the instantaneous value of the MI and of the SD.

Set points for the instantaneous properties: the drier exit properties are compared with the set points of properties, to determine the desired set points for the properties at the stripper exit (the centrifuge is ignored):

$$MIstp_{SP}=10^{(log(MISP)+0.1 \cdot log(MISP)-log(MIshC)))}$$

$$SDstp_{SP}=SD_{SP}+0.1 \cdot (SD_{SP}-SDsh_C)$$

Similarly, the desired set points at the reactor exit are calculated from the deviation between these stripper exit set points and the calibrated values at the stripper:

$$MIr_{SP}=10^{(log(MIstpSP)+0.5 \cdot (log(MIstpSP)-log(MIstpC)))}$$

$$SDr_{SP}=SDstp_{SP}+0.5 \cdot (SDstp_{SP}-SDstp_C)$$

Finally, the desired set points for the instantaneous output are calculated from the deviation between these reactor exit set points and the corresponding calibrated values:

$$MIi_{SP}=10^{(log(MIrSP)+2 \cdot (log(MIrSP)-log(MIrC)))}$$

$$SDSi_{SP}=SDr_{SP}+2 \cdot (SDr_{SP}-SDr_C)$$

Set points for the concentration ratios: the set points for the concentration ratios $HyEt_{SP}$ and $BtEt_{SP}$ are obtained by inverting the static equation used above for the calculation of the instantaneous value of the MI and of the SD, by substituting in the MI and SD terms the desired set points for the instantaneous output and by applying the adaptation parameter.

Starting from:

$$log(MIi_{SP}/kMI)=a_0+a_1 \cdot T_R+a_2 \cdot log(HyEt_{SP})+a_3 \cdot BtEt_R$$

$$SDi_{SP}-kSD=b_0+b_1 \cdot T_R+b_2 \cdot (BtEt_{SP})^{b3}+b_4 \cdot lMI_{INS}$$

one obtains:

$$a_2 \cdot log(HyEt_{SP})=log(MIi_{SP}/kMI)-(a_0+a_1 \cdot T_R+a_3 \cdot BtEt_R)$$

which gives:

$$HyEt_{SP}=10^{((log(MIiSP/kMI)-a0-a1 \cdot TR-a3 \cdot BtEtR)/a2)}$$

and $$b_2 \cdot (BtEt_{SP})^{b3}=SDi_{SP}-kSD-(b_0+b_1 \cdot T_R+b_4 \cdot lMI_{INS})$$

which gives:

$$BtEt_{SP}=((SDi_{SP}-kSD-b_0-b_1 \cdot T_R-b_4 \cdot lMI_{INS})/b_2)^{1/b3}$$

The above equations summarize the equations of the master algorithm. They are performed every 30 seconds by the SNCC.

With this process it is possible to control the polymerization with great precision. In particular:

the controlled properties (MI and SD) are maintained as near as possible to the desired values, with a minimal scatter the changes of grade (and hence of the MI and SD properties) are carried out with speed and precision polymerization start-ups and stoppages, as well as the changes in the production rate of the process, are carried out in a more speedy manner, while the MI and the SD are maintained very near the desired values.

Although the control method according to the invention has been presented with the aid of a process for the synthesis of polyethylene by continuous polymerization of ethylene, it is to be understood that this control method will be generally effective for other processes of synthesis, and in particular for the processes exhibiting one or more of the following characteristics:

a multivariable control is necessary because a number of variables affect the set of the properties to be regulated;

the process dynamics are slow: mixings in series, long dead times;

the measurements of the properties are sampled at a low frequency and/or are noisy;

the control must be dynamic, that is to say valid regardless of the production rate of the process, as well as during the changes in the production rate and in the grade (properties) of the product to be synthesized;

it is advantageous to estimate some variables which are not measured directly.

To be capable of being easily implemented with the techniques presented, it suffices that:

the static equations of the process are known (they are often known at least in a certain measure, otherwise the process could not be controlled);

the process dynamics can be approached using perfect mixtures and dead times;

the necessary measurements are available and of sufficient quality (in particular the flow rates of the reactants and the flow rates passing through the storage vessels concerned).

The particular use of the LAG function described above, especially in theorems 1 and 2, can naturally be extended to control methods based on a structure other than that which has been set out, which includes a master algorithm and a slave algorithm which are different. It can, for example, be applied in a controlled method comprising only a single algorithm.

EXAMPLES 8 trials of synthesis of polyethylene (PE) of 4 different types (defined by the MI, SD, etc.) were carried out, by using a conventional control method and by using the method of the invention, respectively. The table below summarizes the findings which were made on the basis of many measurements of the melt index of the 8 polymers obtained. Cpk denotes the centred capability value of the process.

| PE type | Conventional control | | Control according to the invention | |
| --- | --- | --- | --- | --- |
| | Standard deviation | Cpk | Standard deviation | Cpk |
| 1 | 0.127 | 0.909 | 0.059 | 2.202 |
| 2 | — | 0.61 | — | 2.0 |
| 3 | — | 0.48 | — | 1.88 |
| 4 | — | 0.64 | — | 1.09 |

It is found that the capability value Cpk is more than doubled by virtue of the use of the method of the invention, which shows that the properties are approximately half as scattered and/or better-centred in relation to the set points imposed.

| Table of the abbreviations employed | |
|---|---|
| $a_I$ | parameters for the static equation of the MI (I = 0 to 3) |
| $b_I$ | parameters for the static equation of the SD (I = 0 to 4) |
| $A_{Et}$ | catalytic activity for ethylene ($m^3\ kg^{-1}\ h^{-1}$) |
| $CX_{GC}$ | concentration of "x" obtained by measurement from the analyser ($kg/m^3$) |
| $cx_R$ | concentration of "x" in the reactor ($kg/m^3$) |
| $cx_{SP}$ | set point for the concentration of "x" in the reactor ($kg/m^3$) |
| Fpx | mass flow rate of polymerization of "x" (production rate) (kg/h) |
| $FV_{OUT}$ | volume flow rate leaving the reactor ($m^3/h$) |
| $Fx_{IN}$ | mass flow rate of "x" entering (kg/h) |
| $Fx_{OUT}$ | mass flow rate of "x" leaving (kg/h) |
| kd | deactivation constant of the catalyst (l/h) |
| KfBt | corrective (adaptation) parameter for butene |
| KfHy | corrective (adaptation) parameter for hydrogen |
| kMI | corrective (adaptation) parameter for the MI |
| kSD | corrective (adaptation) parameter for the SD |
| LAG (,) | low-pass filter function of the 1st order |
| $MI_{MES}$ | measurement of the MI (Melt Index) |
| MIy | raw (uncalibrated) MI in "y" |
| $MIy_c$ | calibrated MI (with adaptation) in "y" |
| $MIy_{SP}$ | (calibrated) set point of MI for "y" |
| $SD_{MES}$ | measurement of the SD (standard density) |
| $SD_y$ | raw (uncalibrated) SD (standard density) in "y" |
| $SDy_c$ | calibrated SD (with adaptation) in "y" |
| $SDy_{SP}$ | (calibrated) set point of SD for "y" |
| $Mx_{RAW}$ | raw (uncalibrated) mass of "x" in the reactor (kg) |
| $Mx_y$ | calibrated mass of "x" (with adaptation) in "y" (kg) |
| $R_X$ | reactivity of X in the reactor |
| $V_Y$ | volume of "y" ($m^3$) |
| $\tau_R$ | residence time in the reactor (h) |
| $\tau_X$ | residence time for "x" in the reactor (h) |
| | "x" can represent the following constituents: |
| Bt | butene |
| CA | catalyst |
| Et | ethylene |
| Hy | hydrogen |
| Sv | solvent |
| | "y" can represent the following units of equipment: |
| r | polymerization reactor |
| stp | stripper |
| sh | drier (fluidized bed) |

| Legend of the FIGS. | |
|---|---|
| 10 | polymerization reactor |
| 11 | feed of reactants (raw materials), catalyst, solvent |
| 12 | coolant circuit withdrawal pipe |
| 16 | stripper |
| 18 | condenser |
| 20 | 9as phase chromatograph |
| 22 | centrifuger |
| 24 | fluidized bed drier |
| 25 | solvent and reactants to be recycled |
| 26 | polyethylene |
| 27 | reactants to be recycled |
| 28 | solvent to be recycled |
| 30 | set points of the polymer property |
| 31 | set points of the process production rate |
| 32 | master algorithm |
| 33 | slave algorithm |
| 34 | concentration set points |
| 35 | entry flow set points |
| 36 | controllers (PID) for the flow rates |
| 37 | measurements |
| 38 | temperature control |
| 39 | temperature feed-forward |
| 40 | polymerization dynamics: chemical kinetics and material balance |
| 41 | simulations of the production rate and of the ratios Hy/Et and Bt/Et |
| 42 | measurements of temperature, of flow rates and of concentrations |
| 43 | controlled process |
| 44 | analysis of a sample of the product synthesized by the process |
| 51 | measurement of quantities related to the course of the process |
| 52 | measurement of the polymer properties |
| 53 | direct model; prediction of the properties at the measurement |
| 54 | comparison: calibration of the model (adaptation) |
| 55 | control algorithm based on the reverse model (feed-forward + feedback) |
| 56 | set points for the variables related to the process |
| 57 | measurements and set points of entry flow rates |
| 58 | measurement of the temperature and prediction of the concentrations |
| 59 | direct model: equations of the properties as a function of the concentrations |
| 60 | prediction of the properties |
| 61 | set points for the concentrations in the reactor |
| 62 | measurement of the entry flow rates |
| 63 | measurement of the concentrations in the reactor |
| 64 | direct model; prediction of the concentrations based on the material balance |
| 65 | concentration predictions |
| 66 | comparison; calculation of the adaptation parameters |

What is claimed is:

1. A control method for synthesis of at least one chemical product in an apparatus comprising at least one reactor (R), in which one or more manipulated variables (GC) is allowed to act on the course of the process in order to make one or more controlled variables (GR) related to the properties of the product and/or to the course of the process, equal to corresponding set points ($C_{GR}$), said method comprising:

(a) inputting set points concerning the controlled variables ($C_{GR}$);

(b) computing, by means of a prediction unit (OP), predictions of the controlled variables ($P_{GR}$), based on measurements of the process manipulated variables ($M_{GC}$);

(c) using a control unit (OC) to compute the set points of the process manipulated variables ($C_{GC}$), based on the set points ($C_{GR}$) and the predictions ($P_{GR}$) of the controlled variables;

(d) transmitting the set points of the process manipulated variables ($C_{GC}$) to actuators, in order to act on the course of the process;

wherein the prediction unit (OP) is based on a mathematical model of the process (M); and wherein the prediction unit (OP) is designed in such a way that the mass $M_{XR}$ of at least one constituent (X) in the reactor (R) is predicted by the equation:

$$M_{XR} = LAG(F_{XRin}, \tau_X, \tau_x)$$

in which:

$F_{XRin}$ is the mass flow rate of the constituent X entering the reactor R;

$\tau_X$ is the residence time of X in the reactor, the value of which is $$\tau_X = M_{XR}/(\Sigma Fxdis)$$

in which:

$M_{XR}$ denotes the last calculated value of the mass of the constituent X present in the reactor R;

$\Sigma$ Fxdis denotes the sum of all the mass flow rates Fxdis at which the constituent X disappears from the reactor R, including by reaction and/or by leaving the reactor;

the function $y=LAG(u, \tau)$ is the solution of the differential equation $$u = \tau \cdot \frac{dy}{dt} + y$$

calculated with the instantaneous value of u and of $\tau$, and with the last calculated value of y.

2. Control method according to claim 1, in which the set point of at least one controlled variable ($C_{GR}$) is corrected on the basis of the deviation between the measurement ($M_{GR}$) and the prediction ($P_{GR}$) of this controlled variable, so as to make the control effective even in the presence of an error in the prediction of this controlled variable ($P_{GR}$).

3. Control method according to claim 1, in which the model (M) of the process is periodically adapted on the basis of the deviation between the predictions ($P_{GR}$) and the measurements ($M_{GR}$) of the controlled variables, such that the model of the process should supply predictions of the controlled variables ($P_{GR}$) which are as near as possible to the measurements of these variables ($M_{GR}$).

4. Control method according to claim 3, in which the measurements ($M_{GR}$) of the controlled variables are involved only in the optional adaptation of the model of the process and are not directly involved in the calculation of the set points of the manipulated variables of the process ($C_{GC}$).

5. Control method according to claim 1, applied to a polymerization process, including one or more of the following additional steps:

calculation of a set point of temperature in the reactor as a function of one or more set points of the product properties; and transmission of this temperature set point to one or more actuators making it possible to modify the temperature in the reactor;

calculation of a heat balance for the reactor, based especially on temperature measurements; use of this heat balance so as to determine the quantity of polymer synthesized per time unit and/or the catalyst efficiency and/or the concentration of at least one reactant in the reactor;

calculation of the quantity of heat produced by the polymerization, by a calculation of the quantity of the reactant or reactants which polymerize; determination by this means of the quantity of heat which must be added or removed to maintain the reactor temperature; use of the result of the said calculation to improve the temperature control, so as to conform as well as possible to the set point of temperature, especially in the case of changes in the production rate.

6. Control method according to claim 1, in which the property $Px_R$ of a constituent "x" in the reactor R, assimilated to a perfectly mixed reactor, is calculated as follows:

$$Px_R = LAG(Px_{IN}, Mx_R/Fx_{IN})$$

where

"Px" is a property of a constituent "x", corresponding substantially to the linear mixing law $Px_{1+2} = w_1 \cdot Px_1 + w_2 \cdot Px_2$, $w_1$ and $w_2$ being the mass fractions of two mixed fractions 1 and 2 of property $Px_1$ and $Px_2$;

$Px_{1+2}$ is the property of x as it leaves the reactor after mixing;

$Px_{IN}$ is the property of the constituent "x" as it enters the reactor R;

$Mx_R$ is the mass of the constituent x in the reactor R;

$Fx_{IN}$ is the mass flow rate of the constituent x entering the reactor R.

7. Control method according to claim 1, including the following steps:

input of set points relating to one or more properties of the product to be synthesized, into a master algorithm;

input of the set point of the production rate of the process into a slave algorithm;

computation of the set points of concentration of the constituents in the reactor with the master algorithm, especially as a function of the set points and of the measurements of the product properties and of measurements or predictions of the concentrations of the various constituents in the reactor;

transmission of the set points of concentration which are calculated by the master algorithm as input variables into the slave algorithm;

computation of flow rate set points of the constituents entering the reactor, with the slave algorithm, especially as a function of the set point of the process production rate, of concentration set points and of flow rate measurements of the constituents entering the reactor, and transmission of the flow rate set points which are calculated with the slave algorithm to one or more actuators in order to control the flow rates of the constituents entering the reactor, in which the master algorithm and/or the slave algorithm are used in accordance with one of the preceding claims.

8. Control method according to claim 7, characterized in that the master algorithm includes:

a prediction unit based on a direct model of the process allowing to supply a prediction of the properties of the synthesized product as a function of measurements and/or of predictions of the concentrations of the constituents;

an adaptation unit comparing the predictions of properties calculated by the prediction unit with values actually measured on the synthesized product and deriving adaptation parameters from this comparison, the said adaptation parameters being involved as additional inputs into the said prediction unit of the master algorithm; and a control unit based on a reverse model of the process, for computing, as a function of the set points and of the predictions of properties of the product to be synthesized, concentrations set points for the slave algorithm, the said adaptation parameters also being involved as additional inputs into the said control unit.

9. Control method according to claim 8 applied to a polymerization process, in which:

the melt index (MI) and/or the standard density (SD) of the polymer and/or its comonomer content are measured periodically;

the prediction unit of the master algorithm calculates raw predictions of MI and of SD as a function of the temperature in the reactor, of the concentrations in the reactor and of the residence time in the various units of equipment in the polymerization circuit;

periodically, the adaptation unit of the master algorithm:
resynchronizes the raw predictions of MI and SD, taking into account the time elapsed between the taking of the measurements of MI and SD and obtaining the result of the measurements, and compares the resynchronized raw predictions of MI and SD with the measurements of MI and SD, calculates a multiplicative adaptation parameter kMI applied to the raw prediction of the MI to obtain a calibrated prediction of the MI, and calculates an additive adaptation parameter kSD applied to the raw prediction of SD to obtain a calibrated prediction of SD.

10. Control method according to claim 7, in which the slave algorithm includes:

a prediction unit based on a direct model of the process allowing to supply a prediction of the concentrations of one or more of the constituents, based on a material balance in the reactor;

an adaptation unit comparing the predictions of concentrations calculated by the direct model with measurements of concentration and deriving adaptation parameters from this comparison, the said adaptation parameters being involved as additional inputs into the said prediction unit of the slave algorithm; and a control unit based on a reverse model of the process, for computing, as a function of the production rate set point, of the concentration set points computed by the control unit of the master algorithm and of the predictions of concentration which are computed by the prediction unit of the slave algorithm, the set points for the flows entering the reactor, the said adaptation parameters being involved as additional inputs into the said control unit of the slave algorithm.

11. Control method according to claim 10, in which the adaptation unit of the slave algorithm compares the measurements of the concentrations of propylene (Pe), hydrogen (Hy) and/or optional comonomer (Et) with the values predicted by the prediction unit of the slave algorithm, so as to determine at least one of the following adaptation parameters:
a) the specific activity of the catalyst for propylene "APe", in kg/h of polypropylene per kg of catalyst and per kg/m$^3$ of propylene;
b) the gain error in the measurement of hydrogen flow rate "KfHy";
c) the purity of the comonomer feed "KfEt".

12. Control method according to claim 1, applied to the control of the continuous synthesis of polyethylene by polymerization of ethylene in at least one reactor, the reactants including ethylene, hydrogen and/or an optional comonomer, the polymerization reaction taking place in the presence of a catalyst and part of the content of the reactor being continuously or intermittently removed.

13. Control method according to claim 10, in which the adaptation unit of the slave algorithm compares the measurements of the concentrations of ethylene (Et), hydrogen (Hy) and/or optional comonomer (Bt) with the values predicted by the prediction unit of the slave algorithm, so as to determine at least one of the following adaptation parameters:
a) the specific activity of the catalyst for ethylene "AEt", in kg/h of polyethylene per kg of catalyst and per kg/m$^3$ of ethylene;
b) the gain error in the measurement of flow rate of hydrogen "KfHy";
c) the purity of the comonomer feed "KfBt".

14. The control method according to claim 12, wherein the adaptation unit of the slave algorithm compares the measurements of the concentrations of ethylene (Et), hydrogen (Hy) and/or optional comonomer (Bt) with the values predicted by the prediction unit of the slave algorithm, so as to determine at least one of the following adaptation parameters:
a) the specific activity of the catalyst for ethylene "AEt", in kg/h of polyethylene per kg of catalyst and per kg/m$^3$ of ethylene;
b) the gain error in the measurement of the flow rate of hydrogen "KfHy"; or
c) the purity of the comonomer feed "KfBt".

15. Control method according to claim 1, applied to the control of the continuous synthesis of polypropylene by polymerization of propylene in at least one reactor, the reactants including propylene, hydrogen and/or an optional comonomer, the polymerization reaction taking place in the presence of a catalyst and part of the content of the reactor being continuously or intermittently removed.

16. The control method according to claim 15, wherein the adaptation unit of the slave algorithm compares the measurements of the concentrations of propylene (Pe), hydrogen (Hy) and/or optional comonomer (Et) with the values predicted by the prediction unit of the slave algorithm, so as to determine at least one of the following adaptation parameters:
a) the specific activity of the catalyst for propylene "APe", in kg/h of polypropylene per kg of catalyst and per kg/m$^3$ of propylene;
b) the gain error in the measurement of hydrogen flow rate "KfHy"; or
c) the purity of the comonomer feed "KfEt".

17. Control method according to claim 1, applied to a polymerization process, in which one or more properties of the polymer are evaluated by employing a technique chosen from near infrared spectroscopy (NIR), Fourier transform infrared spectroscopy (FTIR) and a nuclear magnetic resonance (NMR).

18. Control method according to claim 1, applied to a polymerization process, in which one or more properties of the polymer are evaluated by applying a preestablished correlation relationship to the results of measurements carried out by near infrared spectroscopy (NIR) at a number of wavelengths predetermined as a function of the nature of the polymer and chosen between 0.8 and 2.6 um.

19. A process of synthesis of a chemical product in an apparatus comprising, synthesizing at least one product in said equipment, wherein said equipment is controlled by means of the control method according to claim 1.

20. The control method of claim 1, wherein the set points of the process manipulated variables are transmitted to control units controlling the actuators.

21. A devise for controlling a chemical synthesis process in a synthesis apparatus, comprising:
at least one mixed reactor;
at least one means for inputting a set point of property (CGR) of the product to be synthesized into the computing unit;
at least one means for inputting a set point of a production rate of the product to be synthesized (CGC) into the computing unit;
at least one control unit (OC);
at least one prediction unit (OP);
at least one means for imposing a control variable (CGC) on a suitable actuator, wherein the prediction unit (OP) is designed in such a way that the mass $M_{XR}$ of at least one constituent (X) in the reactor (R) is predicted by the equation:

$$M_{XR} = LAG(F_{XRin} \tau_X, \tau_x)$$

in which:

$F_{XRin}$ is the mass flow rate of the constituent X entering the reactor R;

$\tau_X$ is the residence time of X in the reactor, the value of which is $$\tau_X = M_{XR}/(\Sigma Fxdis)$$

in which:

$M_{XR}$ denotes the last calculated value of the mass of the constituent X present in the reactor R;

$\Sigma$ Fxdis denotes the sum of all the mass flow rates Fxdis at which the constituent X disappears from the reactor R, especially by reaction and/or by leaving the reactor;

the function $y = LAG(u, \tau)$ is the solution of the differential equation $$u = \tau \cdot \frac{dy}{dt} + y$$

calculated with the instantaneous value of u and of $\tau$, and with the last calculated value of y wherein the prediction unit (OP) is based on a mathematical model of the process (M); and calculated with the instantaneous value of u and of $\tau$ and with the last calculated value of y.

* * * * *